United States Patent [19]

Alford

[11] Patent Number: 5,027,332

[45] Date of Patent: Jun. 25, 1991

[54] METHOD FOR GEOPHYSICAL EXPLORATION

[75] Inventor: Richard M. Alford, Broken Arrow, Okla.

[73] Assignee: Amoco Corporation, Chicago, Ill.

[21] Appl. No.: 370,366

[22] Filed: Jun. 22, 1989

Related U.S. Application Data

[63] Continuation of Ser. No. 108,841, Oct. 14, 1987, abandoned.

[51] Int. Cl.$^5$ .......................... G01V 1/28; E21B 49/00
[52] U.S. Cl. ........................................ 367/75; 367/31; 364/421
[58] Field of Search .............................. 367/25, 31, 75; 364/421; 73/815, 594

[56] References Cited

U.S. PATENT DOCUMENTS

| | | | |
|---|---|---|---|
| 4,631,964 | 12/1986 | Sprint et al. | 367/13 |
| 4,713,968 | 12/1987 | Yale | 367/31 |
| 4,789,969 | 12/1988 | Naville | 367/36 |
| 4,794,572 | 12/1988 | Sandergeld et al. | 73/152 |
| 4,803,669 | 2/1989 | Airhart | 367/72 |
| 4,817,061 | 3/1989 | Alford et al. | 367/75 |
| 4,832,148 | 5/1989 | Becker et al. | 367/25 |

FOREIGN PATENT DOCUMENTS 0169075 1/1986 European Pat. Off. .

*Primary Examiner*—Nelson Moskowitz
*Attorney, Agent, or Firm*—Timothy D. Stanley

[57] ABSTRACT

A method and system for geophysical exploration including processing, displaying and interpreting seismic data. A concord of seismic signals is produced from the seismic wave energy detected for selected combinations of receiver and source locations. A rotation module operates on the concord of the seismic signals so as to generate diagonalized concords of seismic signals so as to focus on a particular component of the seismic wave energy in order to infer the geologic characteristics of the earth's subterranean formations. Additionally, measures of rotation angles necessary to diagonalize the concord of seismic signals can be obtained and displayed overlayed on the diagonalized concord of seismic signals or independently.

45 Claims, 19 Drawing Sheets

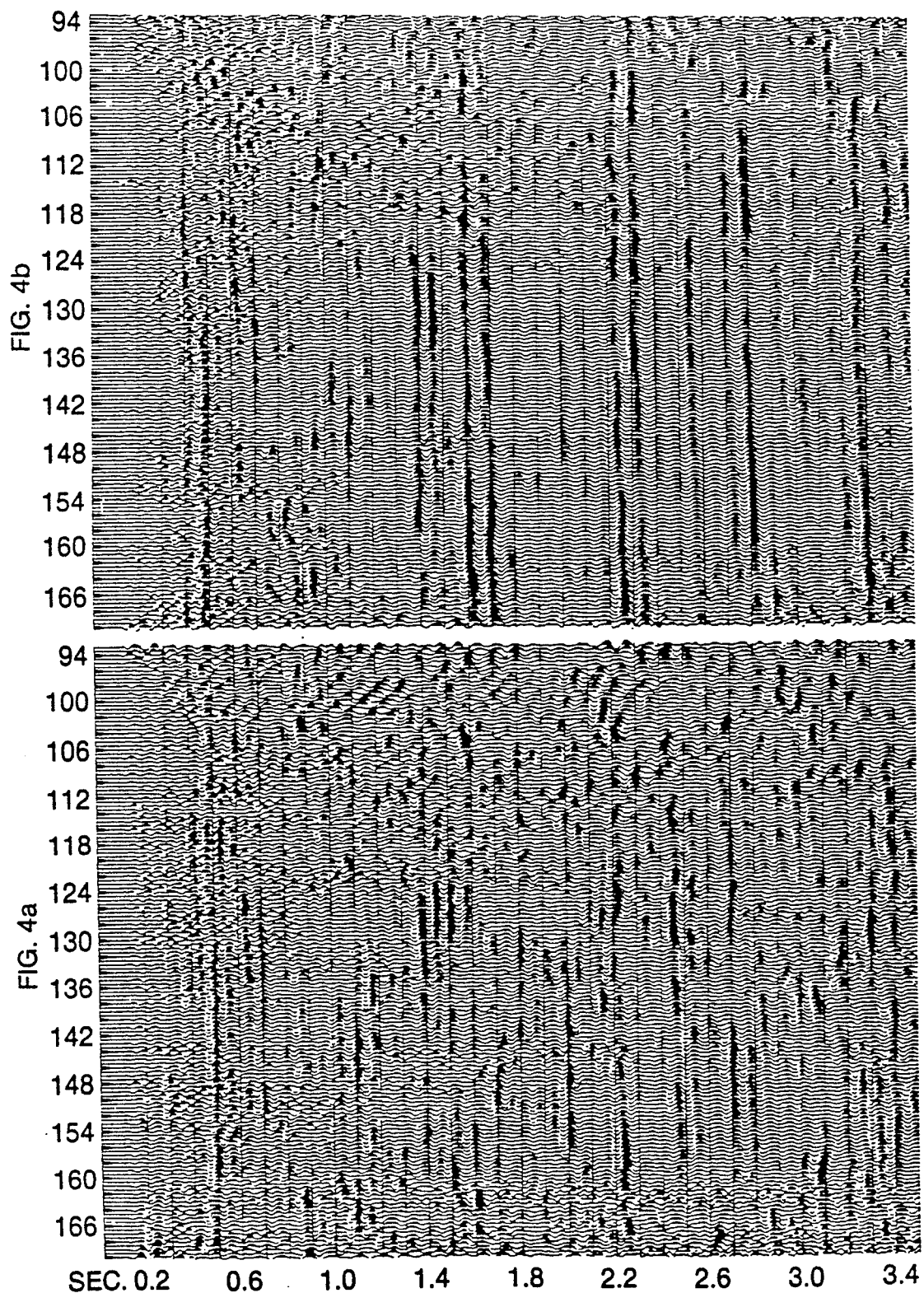

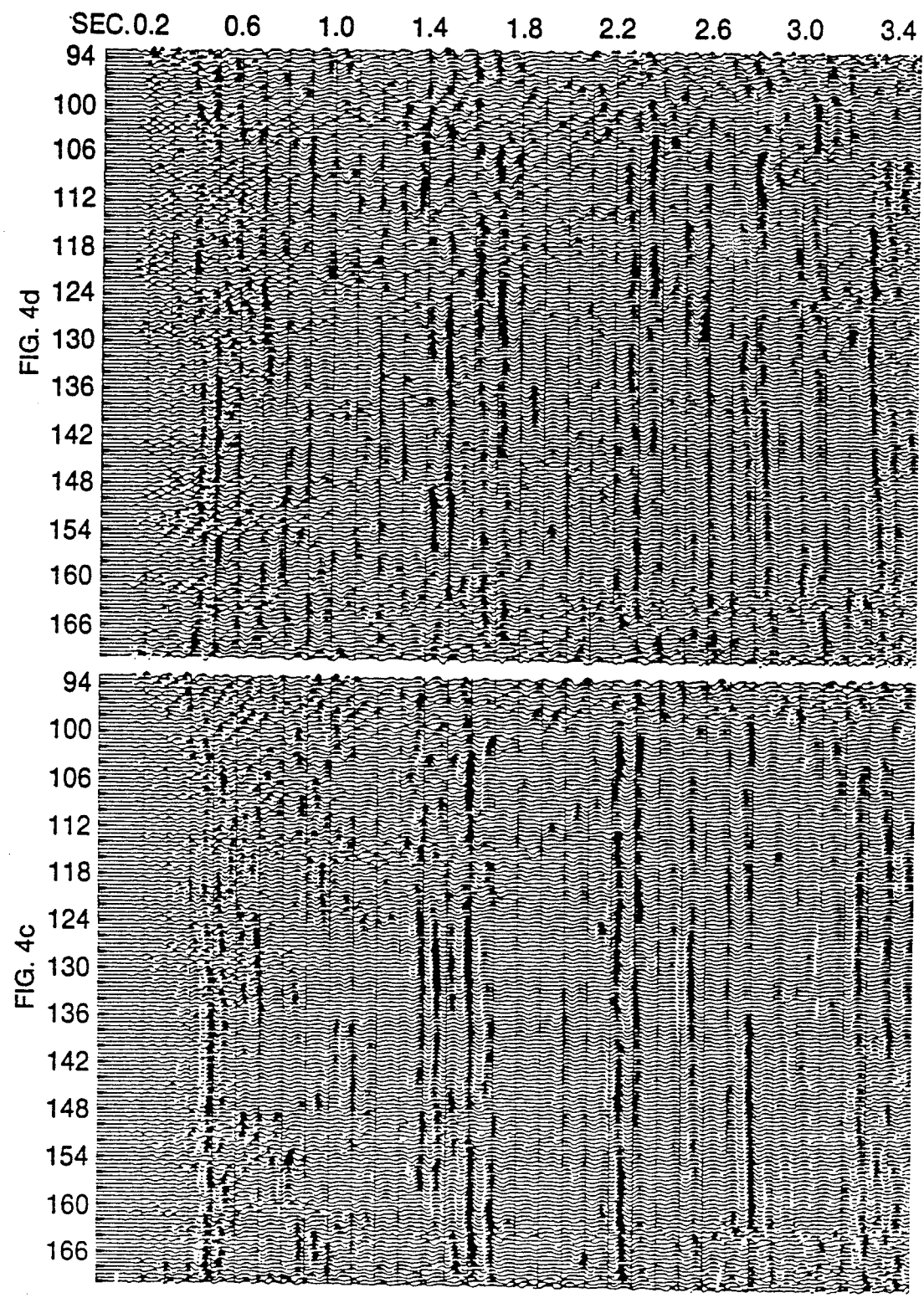

$\varphi_{22}$ (0°)

$\overline{\varphi}_{12}$ (60°)

$\bar{\varphi}_{21}$ (60°)

$\hat{\varphi}_{11}$

METHOD FOR GEOPHYSICAL EXPLORATION

This is a continuation of copending application Ser. No. 108,841 filed Oct. 14, 1987 now abandoned.

BACKGROUND OF THE INVENTION

The present invention relates generally to the field of geophysical exploration. Specifically, novel methods for processing, interpreting, and displaying seismic data having improved quality as well as new information concerning the earth's subterranean formations are disclosed.

Historically, shear wave seismic exploration techniques have employed shear wave seismic sources and shear wave seismic receivers in a seismic survey to gather seismic data. Such a seismic survey has been either linear or areal in its extent. The seismic energy imparted by the shear wave seismic source is detected by the shear wave seismic receivers after interacting with the earth's subterranean formations. Such seismic surveys, however, have generally been limited to utilizing a shear wave seismic source having a single line of action or polarization, oriented with respect to the seismic survey line of profile, to preferentially generate seismic waves of known orientation, e.g., horizontal shear (Sh) waves or vertical shear (Sv) waves. The shear wave seismic receivers utilized in conjunction with a given shear wave seismic source have similarly been limited to a single line of action or polarization, oriented with respect to the seismic survey line of profile, to preferentially record a single component of the seismic wave, e.g., (Sh) wave or (Sv) wave. As used herein, the term "line of action" generally comprehends a defined vector component direction, such as the motion of a source or the component preferentially detected by a receiver. In present shear wave seismic surveys, the lines of action of the seismic source and the seismic receivers generally have the same orientation relative to the line of profile and are said to be "matched".

As long as seismic surveys were limited to seismic sources and seismic receivers having compressional (P) wave i.e., vertical lines of action) satisfactory results were generally obtained irrespective of the orientation of the seismic survey line of profile with respect to the underlying geological character of the subterranean formations. However, when the seismic sources and seismic receivers are of the shear wave type, i.e., either horizontal shear (Sh) wave or vertical shear (Sv) wave, the orientation of the seismic survey line of profile and/or the line of action of the shear wave seismic source with respect to the geological character of the subterranean formations can determine whether or not meaningful seismic data is obtained.

As understood by those skilled in the art, compressional (P) waves are longitudinal waves where the particle motion is in the direction of propagation. Shear waves are transverse waves where the particle motion is in a transverse plane perpendicular to the direction of propagation. Two special classes of shear waves are defined herein. Specifically, horizontal shear (Sh) waves where the particle motion in the transverse plane is further restricted to be perpendicular to the line of profile of the seismic survey E (i.e., horizontal) and vertical shear (Sv) waves where the particle motion in the transverse plane is further restricted to be perpendicular to the horizontal shear (Sh) particle motion all of which is shown in FIG. 1.

Exemplary of the dependence of the orientation of the seismic survey line of profile with respect to the geological character of the subterranean formation, when matched shear wave seismic sources and shear wave seismic receivers are used, it is known by those skilled in the art that shear wave seismic surveys are adversely affected by azimuthally anisotropic subterranean formations. Azimuthally anisotropic subterranean formations have generally vertical parallel planes of symmetry. (Sh) waves and (Sv) waves interact differently with the symmetry planes of the azimuthally anisotropic subterranean formation especially when the symmetry planes are either parallel to or perpendicular to the line of action of the shear wave.

The interaction differences of (Sh) waves and (Sv) waves have been utilized to detect and measure the anisotropic properties of an azimuthally anisotropic subterranean formation when the seismic lines of profile are properly oriented with respect to the surfaces of the symmetry planes and matched sets of shear wave seismic sources and shear wave seismic receivers have been deployed in the seismic survey. In such applications, (Sh) and (Sv) shear wave seismic sources and seismic receivers are utilized, but only in matched sets, i.e., (Sh) shear wave seismic sources with (Sh) shear wave seismic receivers and (Sv) shear wave seismic sources with (Sv) shear wave seismic receivers.

As shown in FIG. 1, the (Sh) wave and (Sv) wave lines of action for the seismic source S and seismic receiver R are defined with respect to the line of profile of the seismic survey E. As such, the orientation of the seismic survey line of profile with respect to the symmetry planes is critical. Consequently, utilization of matched sets of shear wave seismic sources and shear wave seismic receivers have produced inconsistent results when the seismic survey line of profile has not been properly laid out with respect to the anisotropic geological character of the subterranean formations.

Those acquainted with the art of seismic exploration, especially in seismically virgin territory, realize that prior knowledge of the geological character of the subterranean formations is generally not available prior to seismic exploration. The method of geophysical exploration of the present invention can be advantageously employed without regard to or knowledge of the geological character of the subterranean formations to obtain meaningful seismic data.

SUMMARY OF THE INVENTION

The present invention comprises a novel method of geophysical exploration whereby concords of seismic data collected with sets of seismic sources and sets of seismic receivers can be processed and displayed to aid exploration geophysicists in interpreting the earth's subterranean formations.

The method includes processing at least one concord of seismic signals by diagonalizing the concords of seismic signals to form diagonalized concords of seismic signals and displaying diagonalized concords of seismic sections. The method further includes obtaining a measure of the rotation angles employed to diagonalize the concord of seismic data and subsequently displaying the rotation angles either overlayed with the diagonalized concord of seismic data or independently.

A rotation module is provided to generate diagonalized concords of seismic signals corresponding to synthetic orientations of the lines of action of the elements in the sets of the seismic sources and the lines of action of the elements in the sets of seismic receivers so as to focus on a particular component of the imparted seismic wave energy. A concord of diagonalized seismic sections produced from diagonalized concord of seismic signals can aid in inferring the geological character of the subterranean formations. The rotation module is adapted to operate on either a concord of unstacked seismic signals or on a concord of stacked seismic signals. The diagonalized concords of the seismic signals provides a method for inferring various features of the subterranean formations.

The rotation module has the effect of synthetically rotating the lines of action of the elements within either the set of seismic sources or the set of seismic receivers or both, into new lines of action. The resulting diagonalized concords of seismic signals thus appear as if they had been originally acquired with sets of seismic sources and/or sets of seismic receivers having elements with such synthesized new lines of action.

The ability to obtain shear wave seismic data in a given seismic survey with shear wave seismic sources and shear wave seismic receivers having fixed lines of action and thereafter synthetically rotating the lines of action with a rotation module as well as displaying measures of the rotation angles affords a significant improvement in the shear wave seismic data quality as well as the interpretation thereof.

BRIEF DESCRIPTION OF THE DRAWINGS

FIGS. 4a, b, c and d are a concord of seismic data as collected in the field;

DETAILED DESCRIPTION OF THE PREFERRED EMBODIMENT

Figure 1:
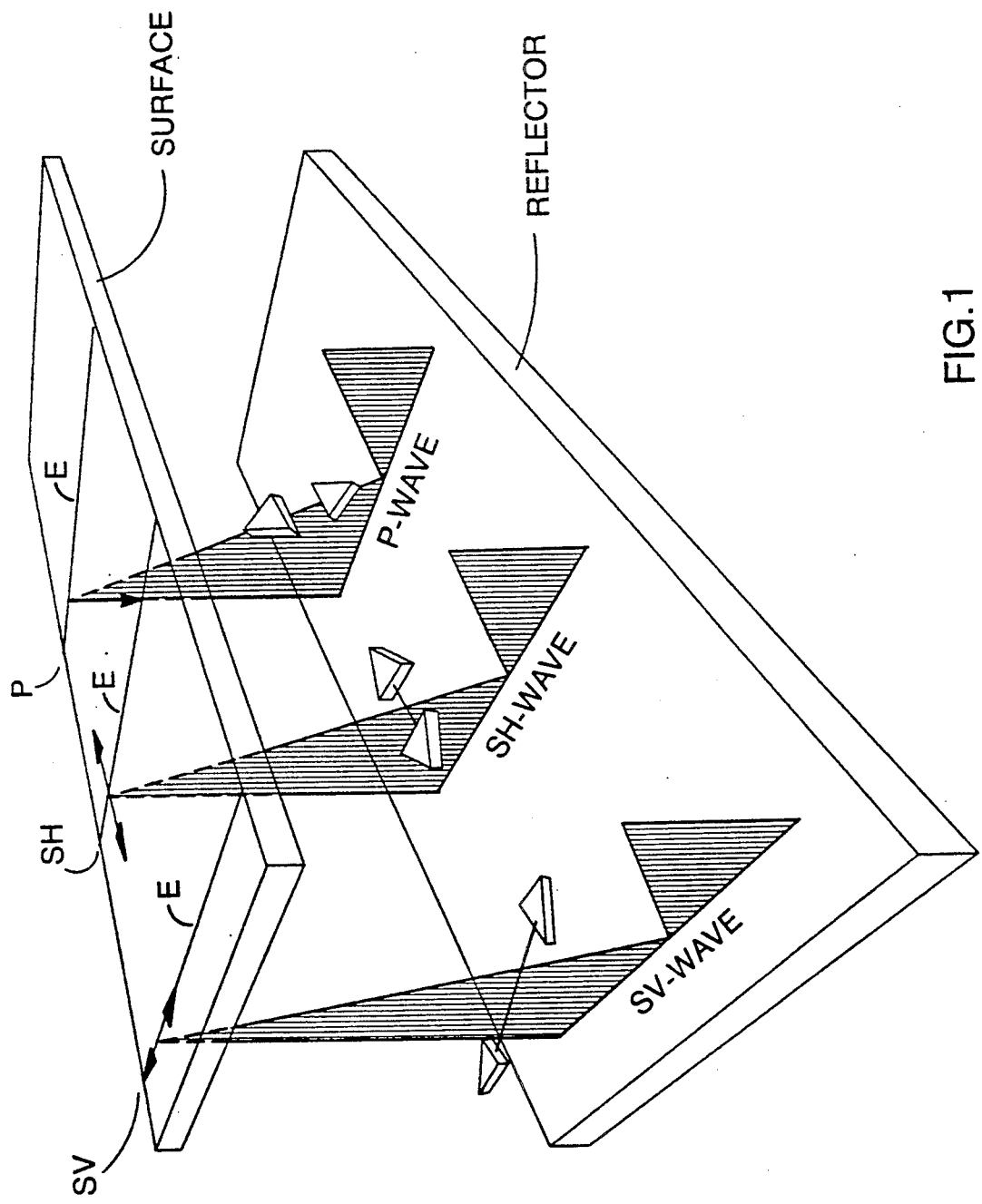
FIG. 1 is a schematic representation defining the relationship between a line of action and a line of profile in a seismic survey.

In order to facilitate a more comprehensive understanding of the present invention, Table I and a brief discussion of the mathematical notation to be utilized are provided.

TABLE I

| | |
|---|---|
| R | is defined as a set of seismic receivers; |
| S | is defined as a set of seismic sources; |
| $R_p$ | is defined as a set of receiver locations in a seismic survey; |
| $S_q$ | is defined as a set of source locations in a seismic survey; |
| $r_i$ | is defined as an element in the set of seismic receivers R having a specified line of action, the index i is a dummy variable which can be replaced by the index c for synthetic lines of action; |
| $s_j$ | is defined as an element in the set of seismic sources S having a specified line of action, the index j is a dummy variable which can be replaced by the index m for synthetic lines of action; |
| $\Phi_{ij}$ | is defined as a general collection of seismic signals generated by the receiver elements $r_i$ in response to the seismic energy imparted by the source elements $s_j$; |
| $\Phi_{11}, \Phi_{12}$ | etc. are defined as specific components of the general collection of seismic signals $\Phi_{ij}$ produced with source elements $s_j$ and receiver elements $r_i$ having specified lines of action; |
| K | is defined as a concord for a specific collection of the seismic signals $\Phi_{ij}$ for all indices i and j, having at least two linearly independent lines of action for the receiver elements $r_i$ and at least two linearly independent lines of action for the source elements $s_j$; |
| $(\Phi_{ij})$pq | is defined as a collection of seismic signals or data generated by imparting seismic wave energy at source locations $S_q$ and detecting seismic wave energy at receiver locations $R_p$, generally, the location indices can be suppressed when source or receiver location information is not relevant; |
| $\beta_{ij}$ | is defined as seismic data resulting from processing the seismic signals $(\Phi_{ij})$pq to produce stacked seismic signals such as common depth point, common source point, or common receiver point; |
| $\beta_{ij}'$ | is defined as a gather of seismic signals $(\Phi_{ij})$pq such as CDP, CSP or CRP; |
| $\hat{\Phi}_{cm}$ | is used in conjunction with $\Phi_{cm}$, K, R, S, $r_i$, and $s_j$ to define a set of seismic sources S and a set of seismic receivers R having elements with lines of action $\hat{s}_j$ and $\hat{r}_i$ synthetically oriented whereby the collection of seismic signals $\Phi_{ij}$ have been diagonalized to produce diagonalized seismic signals $\hat{\Phi}_{cm}$ wherein the cross component signals are substantially reduced to zero; and |
| $\bar{\Phi}_{cm}$ | is used in conjunction with $\Phi_{cm}$, R, S, $r_c$ and $s_m$ to define a set of seismic sources S and a set of seismic receivers R having elements with lines of action $\bar{s}_m$ and $\bar{r}_c$ synthetically oriented at selected angles with respect to the line of profile of the seismic survey to produce synthetic seismic signals $\bar{\Phi}_{cm}$. |

Figure 2A:
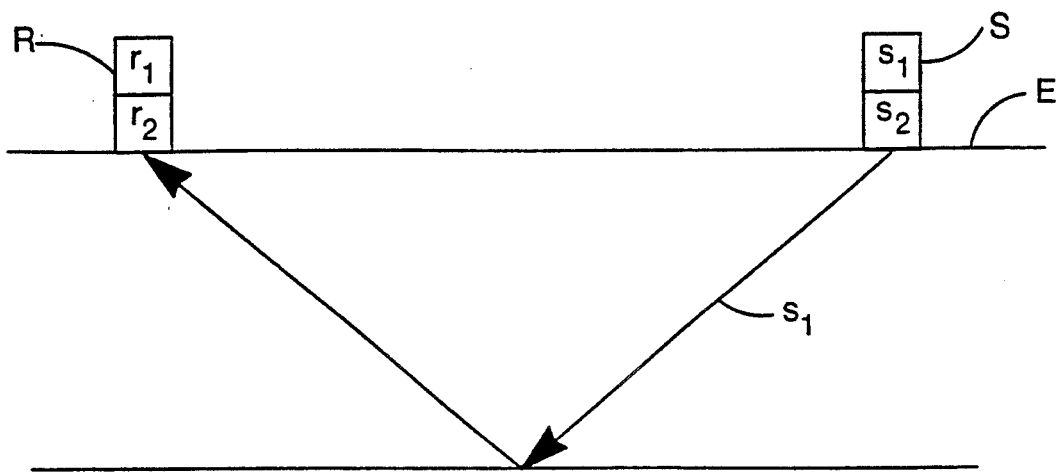
FIGS. 2a-b are schematic examples demonstrating the relationship of the lines of action for the elements $r_i$ and $s_j$ for a single set of seismic receivers and seismic sources.

Looking now to FIG. 2a and b, a set of seismic receivers R is located at a specified location in a seismic survey E. Each set of seismic receivers R includes elements adapted to detect a component of the imparted seismic wave energy. The elements in the set of seismic receivers R have linearly independent lines of action $r_1$ and $r_2$. Additionally, a set of seismic sources S is adapted to impart preferred components of seismic wave energy into the earth's formation at a specified location in the seismic survey E. Each set of seismic sources S includes elements adapted to impart seismic energy into the earth along linearly independent lines of action $s_1$ and $s_2$. The elements in the sets of seismic sources S and seismic receivers R are identified by their lines of action and are hereafter generally denoted $s_j$ and $r_i$, respectively. This notation identifies both the element and the line of action of the element. Upon the independent initiation of each source element $s_j$ in the set of seismic sources S, seismic wave energy having a preferred line of action $s_1$ or $s_2$ is imparted into the earth's formations at the specified location in the seismic survey E. After interacting with the subterranean formation, two components of the seismic wave energy imparted by each source element $s_j$ are detected by the receiver elements $r_i$ in the set of seismic receivers R.

Figure 2B:
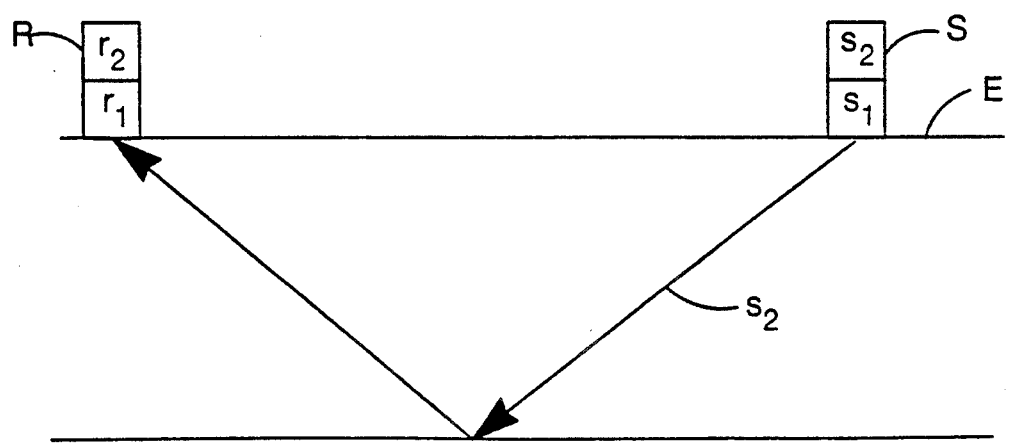

FIGS. 2a and 2b show by way of example, a set of seismic receivers R having elements with lines of action $r_1$ and $r_2$ and a set of seismic sources S imparting seismic wave energy along lines of action $s_1$ and $s_2$. Such configuration is merely by way of example since those skilled in the art will appreciate that typically several sets of seismic sources and seismic receivers can be used simultaneously to obtain the benefits of a spatial array. In this example, the paired lines of actions of $r_1$, $s_1$ and $r_2$, $s_2$ in the set of seismic receivers R and seismic sources S have the same orientation or alignment with respect to the line of profile of the seismic survey E.

FIG. 2a is a schematic representation of the independent initiation of the source element $s_1$ in the set of seismic sources S imparting seismic wave energy into the earth's subterranean formation along the preferred line of action $s_1$ and the measurement of such seismic wave energy with the receiver elements $r_1$ and $r_2$ in the set of seismic receivers R.

FIG. 2b is a schematic representation of the same set of seismic sources S and set of seismic receivers R in FIG. 2a, but shows the independent initiation of source element $s_2$ in the set of seismic sources S imparting seismic wave energy into the earth's subterranean formation along the preferred line of action $s_2$ and the measurement of such seismic wave energy with the receiver elements $r_1$ and $r_2$ in the set of seismic receivers R.

Mathematically, the seismic wave energy detected can be organized in the following matrix form where $(r_i, s_j)$ represents ordered pairs of the elements $r_i$ and $s_j$ in the set of seismic receivers R and the set of seismic sources S:

$$\begin{matrix}(r_1,s_1) & (r_1,s_2) \\ (r_2,s_1) & (r_2,s_2)\end{matrix} = (r_i,s_j) = \phi_{ij} = \begin{matrix}\phi_{11} & \phi_{12} \\ \phi_{21} & \phi_{22}\end{matrix} \quad (1)$$

and where $\phi_{ij}$ connotes a general collection of seismic signals generated for receiver element $r_i$ of the set of seismic receivers R in response to the seismic energy imparted into the earth's subterranean formations by source element $s_j$ in the set of seismic sources S. A specific collection of seismic signals $\phi_{ij}$ for all indices i and j represents the seismic signals generated by the independent initiation of the source elements $s_j$ in the set of seismic sources S along at least two linearly independent lines of action $s_1$ and $s_2$ each detected by elements $r_i$ of the set of seismic receivers along at least two linearly independent lines of action $r_1$ and $r_2$ and is hereafter designated a concord of seismic signals K.

By extension, K can represent a concord of seismic signals $\phi_{ij}$ generated from seismic energy imparted by a set of seismic sources S having three elements $s_1$, $s_2$ and $s_3$ and detected by a set of seismic receivers R having three elements $r_1$, $r_2$, and $r_3$. Each element $s_j$ and $r_i$ have linearly independent lines of action. In the notation that has been introduced:

$$\begin{matrix}(r_1,s_1) & (r_1,s_2) & (r_1,s_3) \\ (r_2,s_1) & (r_2,s_2) & (r_2,s_3) \\ (r_3,s_1) & (r_3,s_2) & (r_3,s_3)\end{matrix} = (r_i,s_j) = \phi_{ij} = \begin{matrix}\phi_{11} & \phi_{12} & \phi_{13} \\ \phi_{21} & \phi_{22} & \phi_{23} \\ \phi_{31} & \phi_{32} & \phi_{33}\end{matrix} \quad (2)$$

Those skilled in the art recognize the relationship between Equations (1) and (2); however, to simplify the nature of the forthcoming description only those sets of seismic sources S and sets of seismic receivers, limited to elements having only two linearly independent lines of action, will be discussed.

Except where specifically noted to the contrary, the general collection of seismic signals $\phi_{ij}$ will be understood, hereinafter, to also comprehend the specific collection of seismic signals designated a concord of seismic signals K. That is, the concord of seismic signals K defines a minimum usable collection of seismic signals $\phi_{ij}$.

When ordered pairs of the elements $r_i$ of the set of seismic receivers R and the elements $s_j$ of the seismic sources S have the same indices, e.g., $(r_1,s_1)$, this notation is intended to indicate that both the elements of the set of seismic sources S and the set of seismic receivers R have the same lines of action or polarization and are said to be "matched". The consequence of employing matched pairs of source elements $s_j$ and receiver elements $r_i$ is to produce matched components of the seismic signals, e.g., $\phi_{11}$ and $\phi_{22}$. If the indices for ordered pairs of the elements of the set of seismic sources S and the seismic receivers R are different, e.g., $(r_1,s_2)$, this notation is intended to indicate that the elements in the set of seismic sources S and the seismic receivers R have different lines of action or polarization and are said to be "unmatched". The consequence of employing unmatched pairs of source elements $s_j$ and receiver elements $r_i$ is to produce unmatched components of the seismic signals, e.g., $\phi_{12}$ and $\phi_{21}$. The unmatched components can also be described as the cross-component terms of the matrix of seismic signals $\phi_{ij}$. Whereas, the general notation $(r_i,s_j)$ comprehends both matched and unmatched pairs of elements of sets seismic sources S and seismic receivers R.

As previously noted, the seismic wave energy imparted by elements $s_j$ in the set of seismic sources S and detected by the elements $r_i$ in a set of seismic receivers R is represented by the seismic signals $\phi_{ij}$. The seismic signals $\phi_{ij}$ contain information regarding the geological character of the subterranean formation. It is understood by those skilled in the art that the seismic signals $\phi_{ij}$ can be collected in a seismic survey E for a plurality of ordered pairs of seismic source locations $S_q$ and receiver locations $R_p$ as shown generally in FIG. 3. In the notation developed, this is generally denoted $(\phi_{ij})_{pq}$; i.e., the seismic response observed by the element $r_i$ in the set of seismic receivers R located at $R_p$ resulting from the seismic energy imparted by the elements $s_j$ a set of seismic sources S located at $S_q$.

Figure 3:
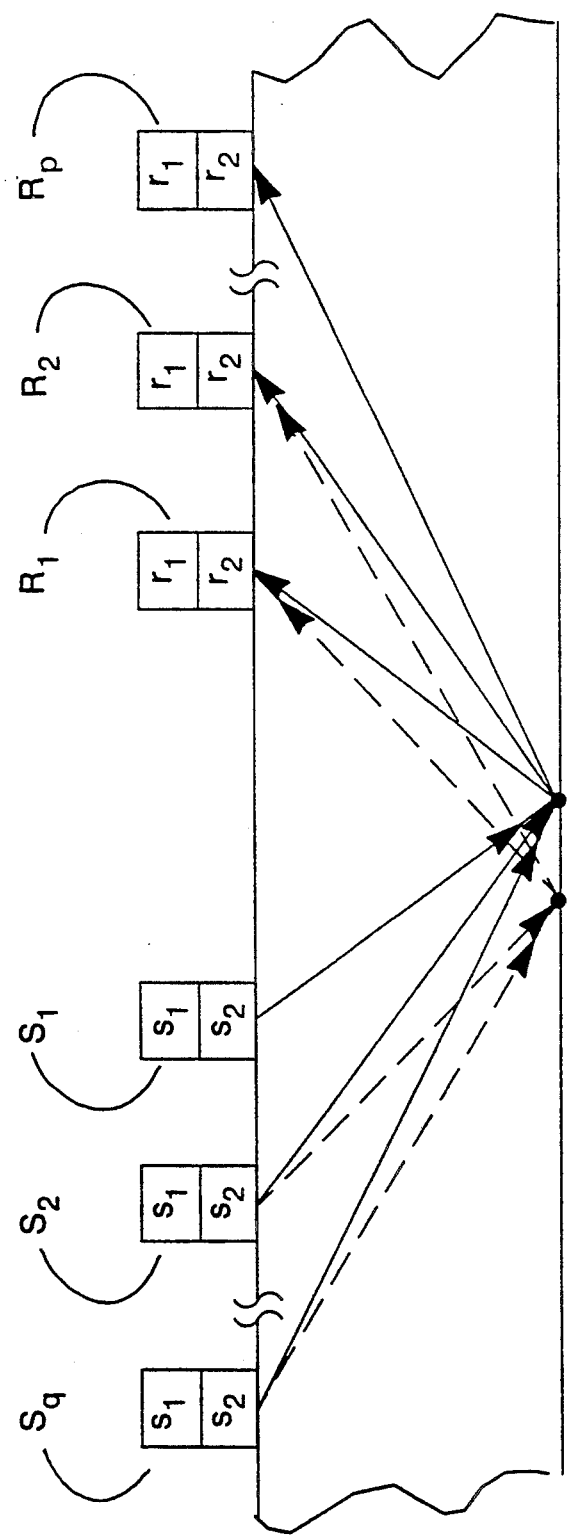
FIG. 3 is a schematic example of the present invention employing multiple sets of seismic sources and seismic receivers.

In FIG. 3, multiple source locations $S_1$, $S_2$, $S_q$ and multiple receiver locations $R_1$, $R_2$, ..., $R_p$ are laid out in the seismic survey E. It is further understood that the seismic survey E can either be linear or areal in extent.

At each source location $S_q$, the source elements $s_j$ in the set of seismic sources S are adapted to impart seismic wave energy into the earth's formations along at least two linearly independent, lines of action $s_1$ and $s_2$. At each seismic receiver location $R_p$, the receiver elements $r_i$ in the set of seismic receivers R are adapted to detect seismic wave energy in at least two linearly independent, lines of action $r_1$ and $r_2$.

Once having acquired a plurality of seismic signals $(\phi_{ij})_{pq}$ in the seismic survey E, the seismic signals $\phi_{ij})_{pq}$ can be processed, for example by common depth point (CDP) processing techniques, to form either CDP stacked seismic signals $\beta_{ij}$ or a common depth point gathers of seismic signals $\beta_{ij}$. The concord of CDP stacked seismic data shown in FIGS. 4a–d were created from the elements of the stacked seismic signals $\beta_{ij}$, i.e., $\beta_{11}$, $\beta_{21}$, $\beta_{12}$ and $\beta_{22}$. Each element of the CDP stacked seismic signals $\beta_{ij}$ is formed by stacking elements of the seismic signal $(\phi_{ij})_{pq}$, e.g., $(\phi_{11})_{pq}$. Since this collection of seismic signals $\phi_{ij}$ is for all i and j, the collection of seismic data displayed in FIGS. 4a–d is referred to as a concord of seismic data.

The concord of seismic data of FIGS. 4a–d was generated from field data and are demonstrative of the difficulties associated with the acquisition of shear wave seismic data. In particular, FIGS. 4a and 4d represent CDP stacked seismic data produced with elements $s_j$ in the set of shear wave seismic sources S and elements $r_i$ in the set of shear wave seismic receivers R having matched lines of action. The seismic data of FIG. 4a is developed from the CDP stacks of the seismic signals $\phi_{22}$ and the seismic data of FIG. 4d is developed from the CDP stacks of the seismic signals $\phi_{11}$. Even to the trained eye, the seismic data of FIGS. 4a and 4d lack sufficient correlation of seismic events and are thus not interpretable.

The seismic data of FIGS. 4b and 4c are CDP stacked seismic data developed from the CDP stacks of the seismic signals $\phi_{12}$ and $\phi_{21}$, respectively. In the CDP seismic data of FIGS. 4b and 4c, the elements $s_j$ and $r_i$ in the sets of seismic sources S and seismic receivers R have unmatched lines of action which are orthogonal one to the other. It is clear even to the untrained eye that significant spatially coherent energy is present in both FIGS. 4b and c. Previously, for such a geometrically simple subterranean formation, both CDP stacks of the seismic signals $\phi_{12}$ and $\phi_{21}$ were believed to contain only noise, i.e., no spatially coherent seismic events. In this case, the misconceptions stem from ignoring the effects of azimuthal anisotropy in the subterranean formations.

Figure 5:
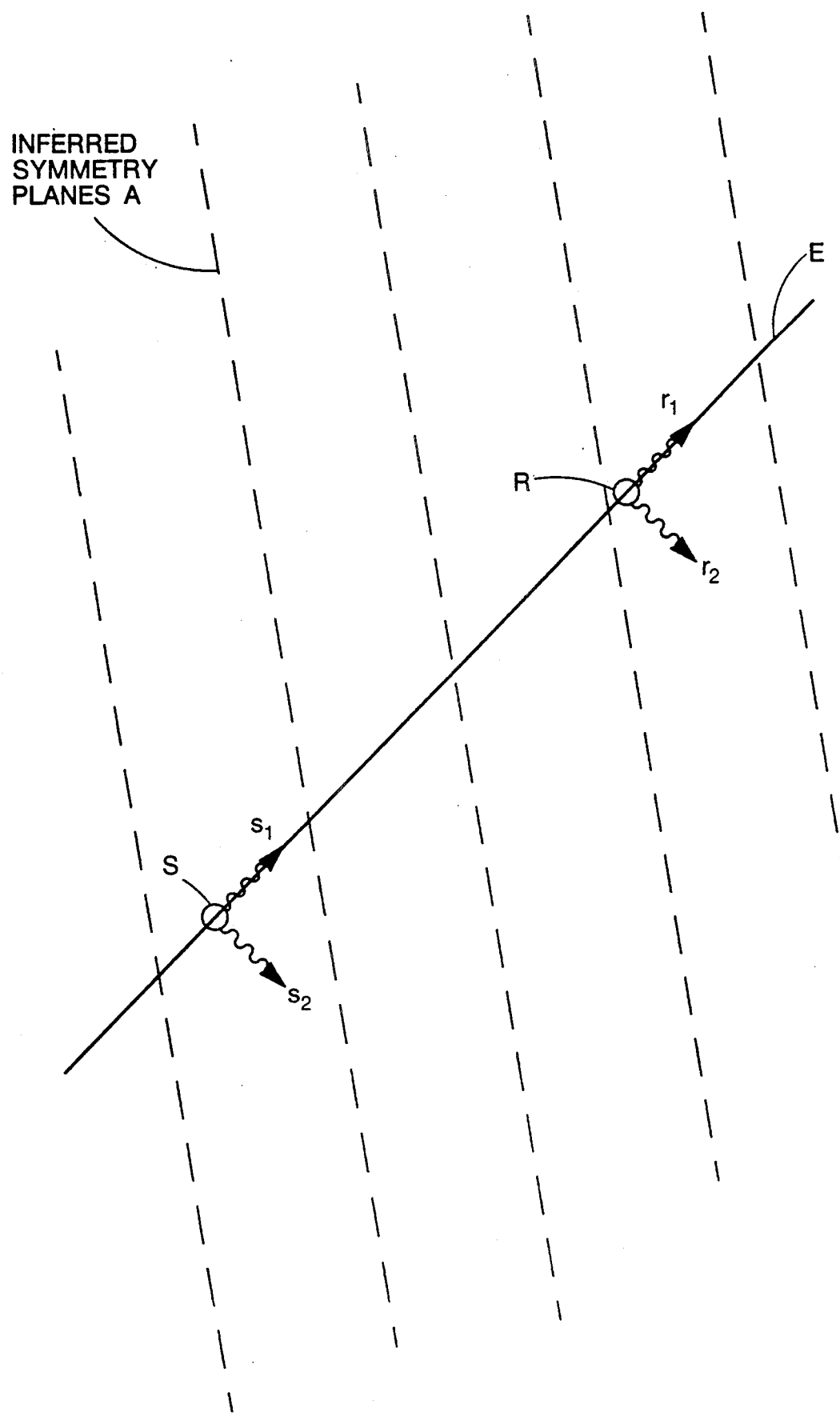
FIG. 5 depicts the orientation of the line of profile of seismic survey with respect to the lines of action of the elements $s_1$ and $s_2$ of the set of seismic sources and the element $r_1$ and $r_2$ of the set of seismic receivers R as well as the inferred orientation of the planes of symmetry A in a subterranean formation for the seismic data displayed in FIGS. 4a, b, c and d.

One known causation of such poor correlation of the seismic data between FIGS. 4a and 4d and the considerable seismic wave energy portrayed in FIGS. 4b and 4c is shear polarization splitting or shear birefringence resulting from an azimuthally anisotropic subterranean formation. In particular, this result can occur if the lines of action of the source elements $s_j$ in the set of the seismic sources S and the lines of action of the receiver elements $r_i$ in the set of seismic receivers R are not appropriately oriented with respect to the symmetry planes of the azimuthally anisotropic subterranean formation. Unfortunately, the orientation of the azimuthally anisotropic subterranean formation's symmetry planes is generally not known beforehand as evidenced in the seismic sections shown in FIGS. 4a and 4d. In fact, FIG. 5 shows the orientation of a line of profile of seismic survey E with respect to the lines of action of the elements $s_1$ and $s_2$ of the set of seismic sources and of the elements $r_1$ and $r_2$ of the set of seismic receivers R as well as the inferred orientation of the planes of symmetry A in a subterranean formation for the seismic data displayed in FIGS. 4a, b, c and d.

ROTATION MODULE

A rotation module F will now be described which can synthetically rotate the lines of action of the elements $r_i$ and $s_i$ of a concord of seismic signal $\phi_{ij}$ through angles $\theta_r$, $\theta_s$, respectively, to new synthetic lines of action of the elements $\bar{r}_i$ and $\bar{s}_j$ of a synthesized concord of seismic signals $\bar{\phi}_{cm}$ so as to correspond to any desired orientation. In particular, the rotation module F is adapted to rotate the lines of action through angles $\theta_s$ and $\theta_r$ whereby the rotated lines of action of the elements $\bar{r}_i$ and $\bar{s}_j$ are aligned with the symmetry planes of an anisotropic formation.

The following is a description of a receiver operator $C_{ci}$ and a source operator $M_{jm}$ collectively referred to as the rotation module F. The rotation module F operates on the seismic signals $\phi_{ij}$ to produce synthetic seismic signals $\bar{\phi}_{cm}$ having synthetic lines of action generally different from those of the original seismic signals $\phi_{ij}$. Preferably, the rotation module F operates on a concord of seismic signals $\phi_{ij}$ to produce a concord of diagonalized seismic signals $\bar{\phi}_{cm}$. It is instructive to recall at this juncture that the indices i,j and c,m are dummy variables and that the changes from indices i,j to c,m have been employed merely as an aid in further differentiating between the seismic signals $\phi_{ij}$ and the synthetic seismic signals $\bar{\phi}_{cm}$ or the diagonalized seismic signals $\bar{\phi}_{cm}$. As will be discussed later, optimizing the selection of particular rotation angles $\theta_r$ and $\theta_s$ for synthetic seismic signals $\bar{\phi}_{cm}$ can be used to infer the geological character of the subterranean formation by focusing on a particular component of the seismic wave energy.

The receiver operator $C_{ci}$ is adapted to transform the lines of action of the elements $r_i$ in the set of seismic receivers R into a synthetic set of lines of action for the elements $\bar{r}_c$ for a synthetic set of seismic receivers $\bar{R}$. The receiver operator $C_{ci}$ is thus a rotation matrix (for angular rotations $\theta_r$ of between 0°–90°) adapted to transform the original set of linearly independent lines of action for the elements $r_i$ in the set of seismic receivers R into a synthetic set of linearly independent lines of action for the elements $\bar{r}_c$ in the set of synthetic seismic receivers $\bar{R}$. Impressing the receiver operator $C_{ci}$ on the seismic signals $\phi_{ij}$ produces synthetic seismic signals $\bar{\phi}_{cj}$ which can be thought of as the result of a set of synthetic receivers $\bar{R}$ with elements $\bar{r}_c$ having linearly independent lines of action generally different from those in the set of seismic receivers R yet still receiving the same seismic wave energy imparted by the elements $s_j$ in the set of seismic sources S.

In a similar fashion, the source operator $M_{jm}$ is adapted to transform the lines of action of the elements $s_j$ of the set of seismic source S into a set of synthetic lines of action of the elements $\bar{s}_m$ for a synthetic set of seismic sources $\bar{S}$. The source operator $M_{jm}$ is thus a rotation matrix (for angular rotations $\theta_s$ of between 0°–90°) adapted to transform the first set of linearly independent lines of action for the elements $s_j$ in the set of seismic sources S into a synthetic set of linearly independent lines of action for the elements $\bar{s}_m$ of a synthetic seismic source $\bar{S}$. Impressing the seismic source operator $M_{jm}$ on the seismic signals $\phi_{ij}$ produces synthetic seismic signals $\bar{\phi}_{im}$ which can be thought of as the result of a set of synthetic seismic sources $\bar{S}$ with elements $\bar{s}_m$ having linearly independent lines of action generally different from those in the set of the seismic source S yet detecting the seismic wave energy with the elements $r_i$ in the set of seismic receivers R.

The combined operation of the operators $C_{ci}$ and $M_{jm}$ on the seismic signals $\phi_{ij}$, more succinctly the operation of rotation module F, produces synthetic seismic signals $\bar{\phi}_{cm}$ which can be thought of as having been acquired from the independent initiation of elements $\bar{s}_m$ in the set of seismic sources $\bar{S}$ and detected by the elements $r_c$ in the set of seismic receivers $\bar{R}$. Using the Einstein summation convention, explicitly noting the source locations $S_q$ and receiver locations $R_p$ and using the above notation:

$$(\bar{\phi}_{cm})_{pq} = (C_{ci})_{pq} (\phi_{ij})_{pq} (M_{jm})_{pq} \quad (3)$$

Hence, one can generate a plurality of synthetic seismic signals $\bar{\phi}_{cm}$ having elements $\bar{r}_c$ and $\bar{s}_m$ for a plurality of synthetic lines of action. More simply stated, the original concord of seismic signals K has been transformed by the rotation module F into a synthetic concord of seismic signals $\bar{K}$. Equation (3) can be written to explicitly show its dependence on the rotation angles $\theta_s$ and $\theta_r$ of the source and receiver operators as well as time in Equation (4):

$$\bar{\phi}_{cm}(t,\theta_r,\theta_s) = C_{ci}(t,\theta_r) \phi_{ij}(t) M_{jm}(t,\theta_s) \quad (4)$$

Thus, Equation (4) provides a mechanism for the rotation module F to produce a plurality of collections of synthetic seismic signals $\bar{\phi}_{cm}$ for a plurality of different angles of rotation $(\theta_r, \theta_s)$ at different times and in particular, to produce a collection of diagonalized seismic signals $\hat{\phi}_{cm}$ for particular angles of rotation $(\theta_r, \theta_s)$ whereby the lines of action of the elements $\hat{s}_m$ and the elements $\hat{r}_c$ are aligned with the symmetry planes of anisotropic formations.

It has been found that numerous adaptations of Equation (4) (i.e., the operation of the rotation module F) can be employed on the collection of seismic signals $\phi_{ij}$ which can aid exploration geophysicists in interpreting the earth's subterranean formations.

In a preferred embodiment, the rotation module F operates on the seismic signals $\phi_{ij}$ so as to substantially diagonalize the collection of seismic signals $\phi_{ij}$. In such embodiment, the rotation module F operates on the collection of seismic signals $\phi_{ij}$ to produce a diagonalized collection of seismic signals $\hat{\phi}_{cm}$ in which the cross-component seismic signals have been substantially reduced to zero (e.g., in the simplest case, $\phi_{12}$ and $\phi_{21} = 0$). However, those skilled in the art recognize that in real seismic signals $\phi_{ij}$ random noise is always present and thus the rotation module F cannot reduce the cross-component terms of the diagonalized seismic signals $\hat{\phi}_{cm}$ to true zero; however, its is possible to minimize the coherent signal component of such seismic signals.

Employing Equation (4) to diagonalize the collection of seismic signals $\phi_{ij}$ leads to a system of two equations to determine the required rotation angles $\theta_r$ and $\theta_s$ to produce a diagonalized collection of seismic signals $\hat{\phi}_{cm}$ using rotation operators $C_{ci}$ and $M_{jm}$ as set forth below:

$$\theta_r = \frac{\alpha - \gamma}{2} \quad (5a)$$

$$\theta_s = \frac{\alpha + \gamma}{2} \quad (5b)$$

where $$\alpha = \tan^{-1}\left( \frac{\phi_{12} + \phi_{21}}{\phi_{11} - \phi_{22}} \right) \quad (5c)$$

$$\gamma = \tan^{-1}\left( \frac{\phi_{12} - \phi_{21}}{\phi_{11} + \phi_{22}} \right)$$

Diagonalization of the collection of seismic signals $\phi_{ij}$ can be interpreted as the development of a new set of data comprising the principal modes of propagation of the imparted seismic waves as well as providing instantaneous source rotation angles $\theta_s$ and receiver rotation angles $\theta_r$ necessary for pure modes of seismic wave propagation. The seismic signals $\phi_{ij}$ forming the concord of seismic signals K are thus transformed into a diagonalized concord of seismic signals $\hat{K}$ as well as producing measures of the rotation angles $\theta_r(t)$ and $\theta_s(t)$.

Given the seismic signals $\phi_{ij}$ comprising the concord K, application of Equation (5) can produce rotation angle traces, $\theta_s(t)$ and $\theta_r(t)$. The rotation angle traces can then be used in the rotation process, described in equation (4), to produce a diagonalized concord of seismic signals $\hat{\phi}_{cm}$. Additionally, measures of the rotation angles $\theta_s(t)$ and $\theta_r(t)$, or alternatively, the average rotation angle $\theta(t) = [\theta_s(t) + \theta_r(t)]/2$ can be overlayed on the diagonalized concords of seismic signals $\hat{\phi}_{cm}$.

Diagonalization is a useful transformation. The original confused concord of seismic signals $\phi_{ij}$, can be transformed into a diagonalized set of seismic signals $\hat{\phi}_{cm}$, and a set of rotation angle traces $\theta_r(t)$ and $\theta_s(t)$. There is no loss of information; the transformation is reversible and the original data can be reconstituted from the new data.

Depending upon the application, either the individual receiver $\theta_r(t)$ and source $\theta_s(t)$ rotation angle traces, or the average or difference of the receiver $\theta_r(t)$ and source $\theta_s(t)$ rotation angle traces may be more pertinent. The average of the rotation angles traces $\theta(t)$ are particularly useful for seismic data where the original source and receiver element lines of action are colinear and orthogonal.

Figure 6A:
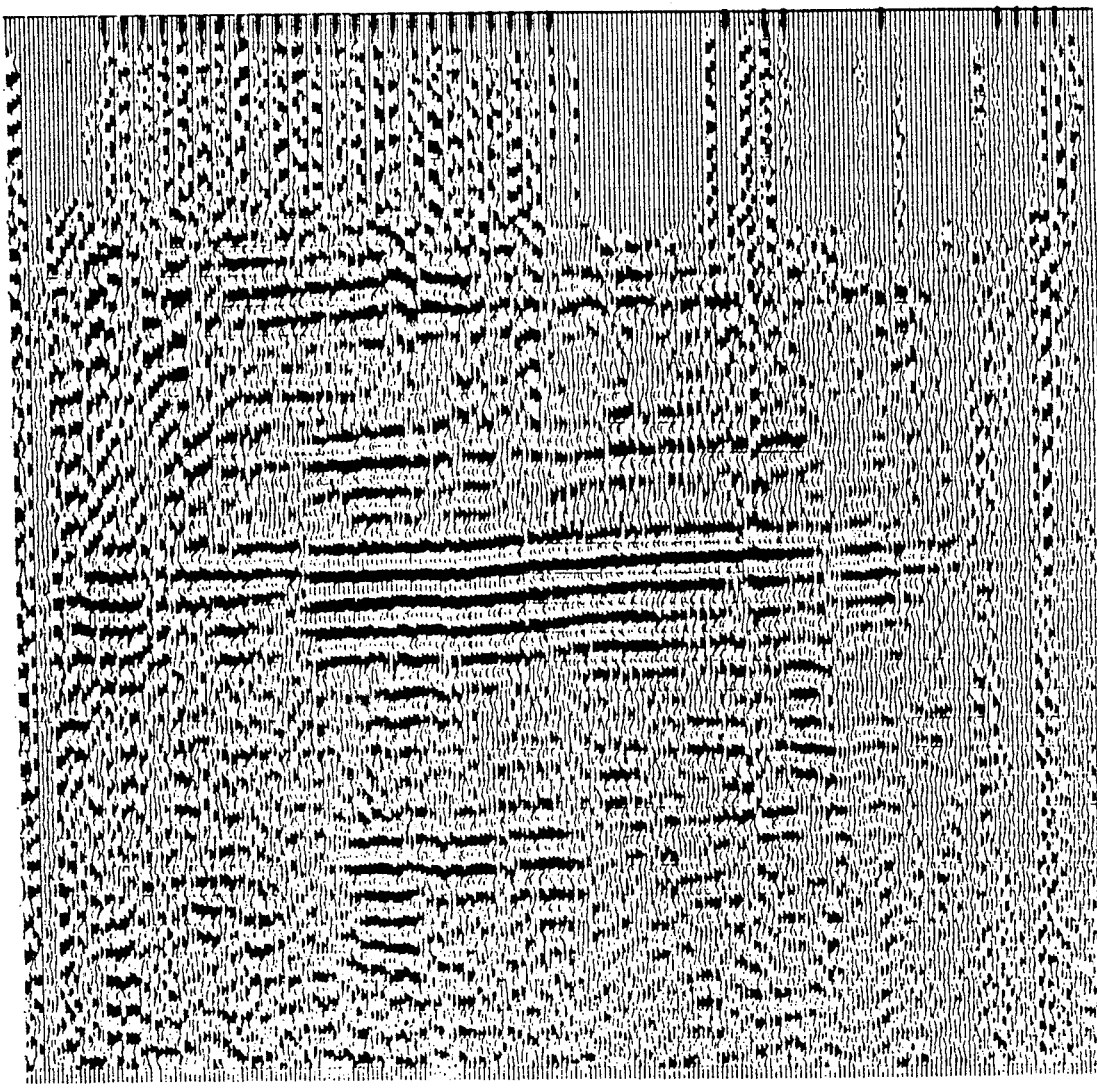
FIGS. 6a, b, c and d represent a concord of seismic signals $\phi_{ij}$ as collected by sets of seismic sources having elements $s_1$ and $s_2$ and sets of seismic receivers R having elements $r_1$ and $r_2$ whereby the following seismic signals $\phi_{11}$, $\phi_{12}$, $\phi_{21}$ and $\phi_{22}$ are shown respectively.
Figure 6B:
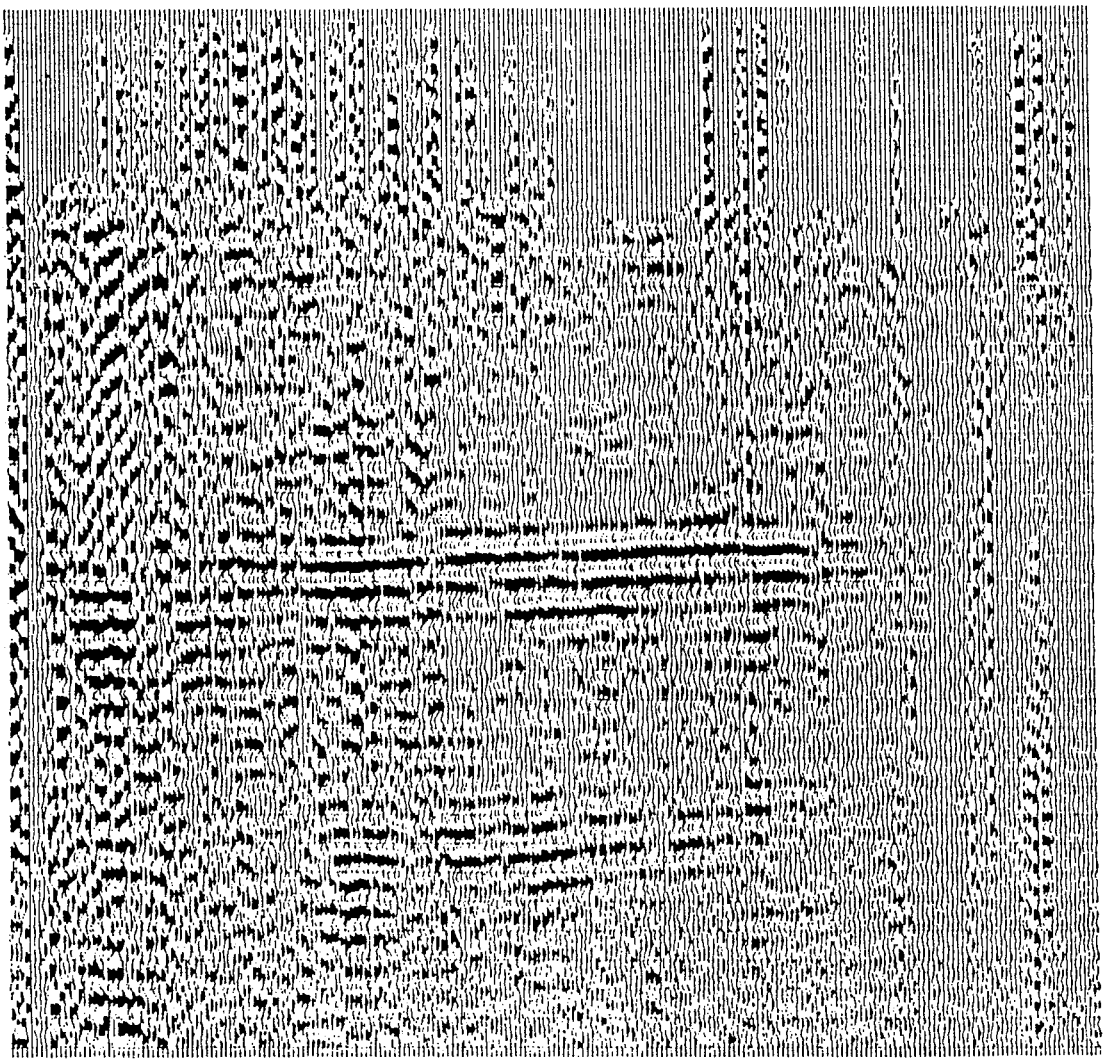
Figure 6C:
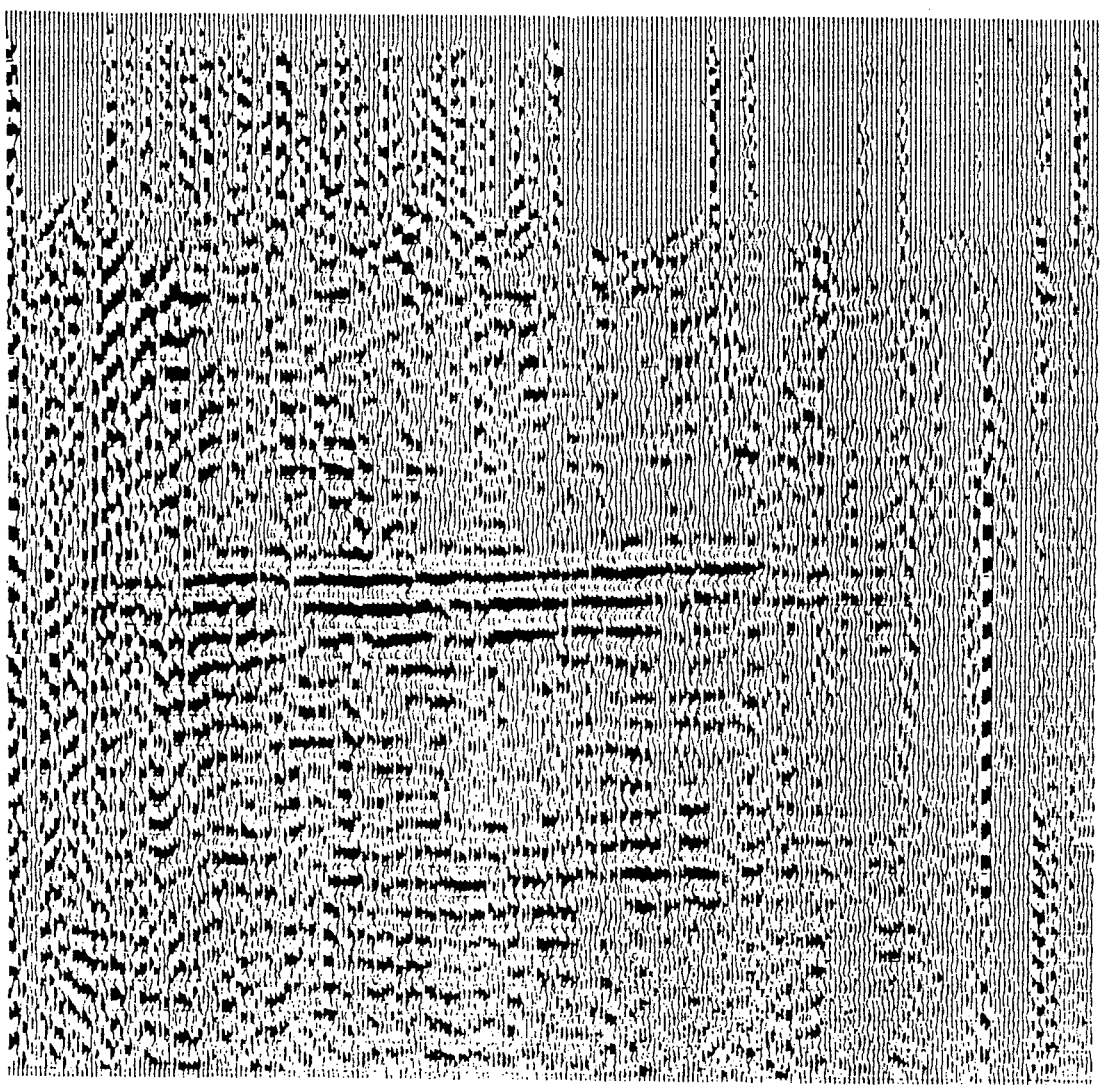
Figure 6D:
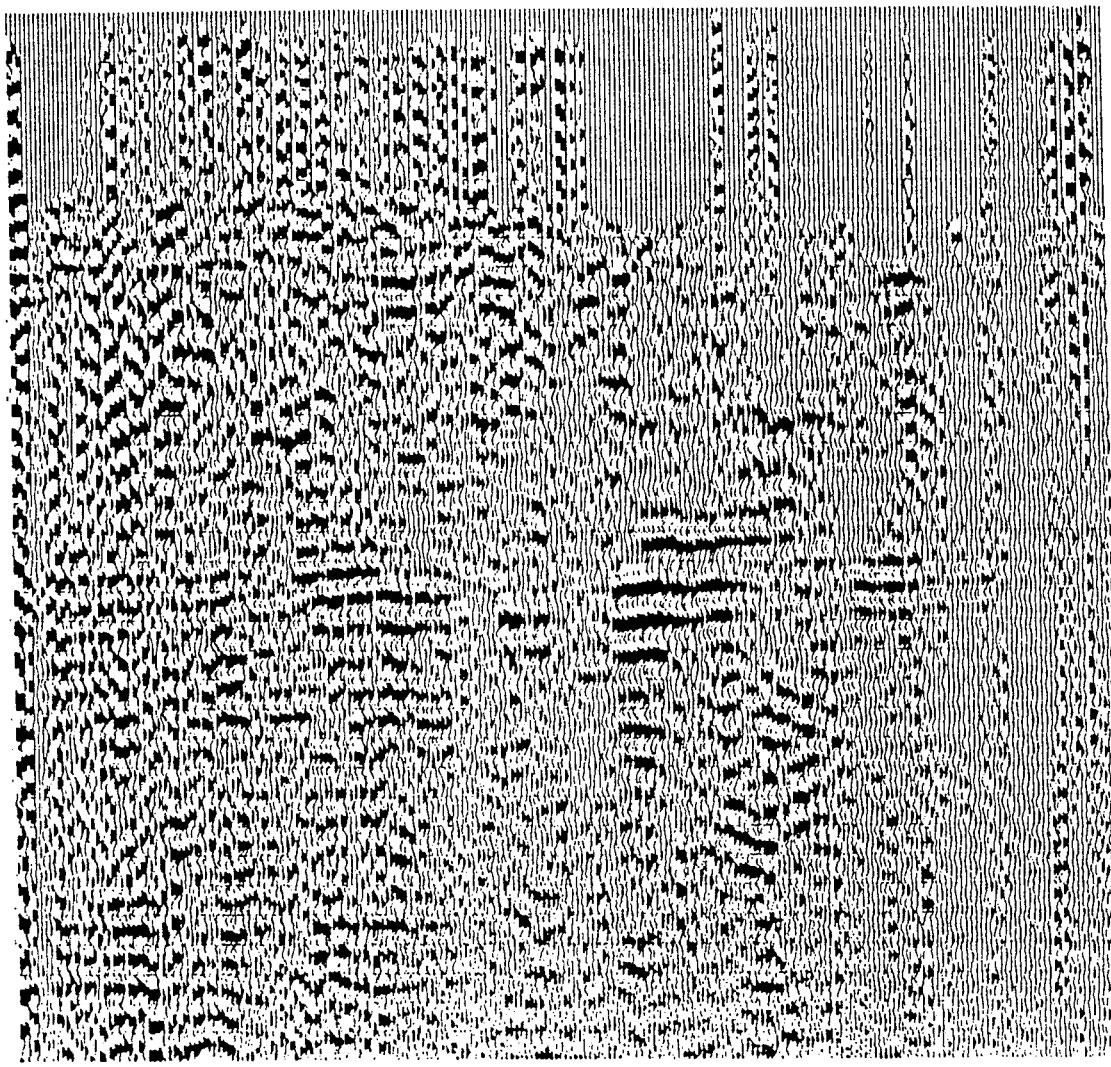
Figure 7A:
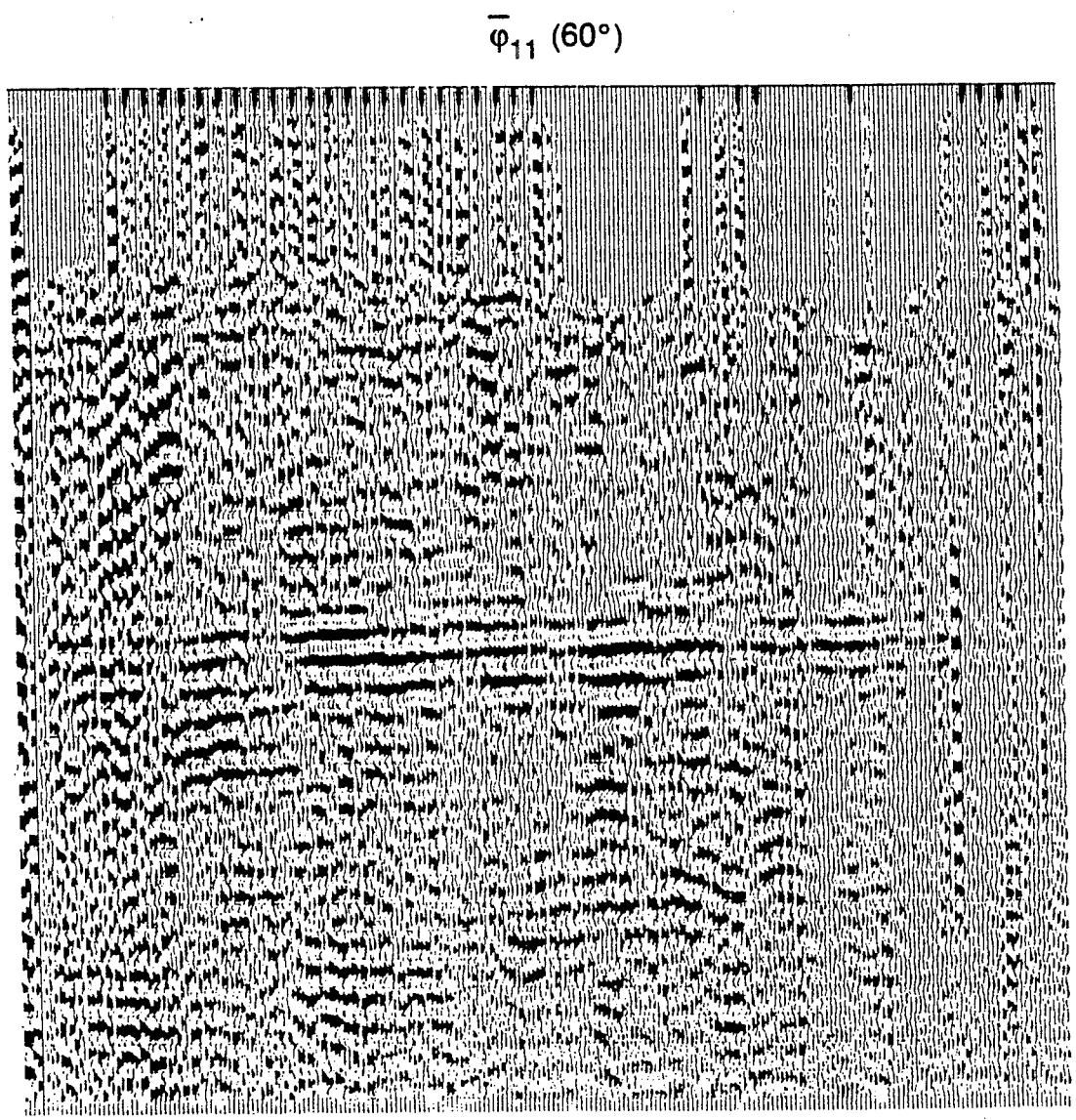
FIGS. 7a, b, c and d represent a synthetic concord of seismic signals $\bar{\phi}_{cm}$ obtained by rotating the concord of seismic signals $\phi_{ij}$ shown in FIGS. 6a, b, c and d through 60°.
Figure 7B:
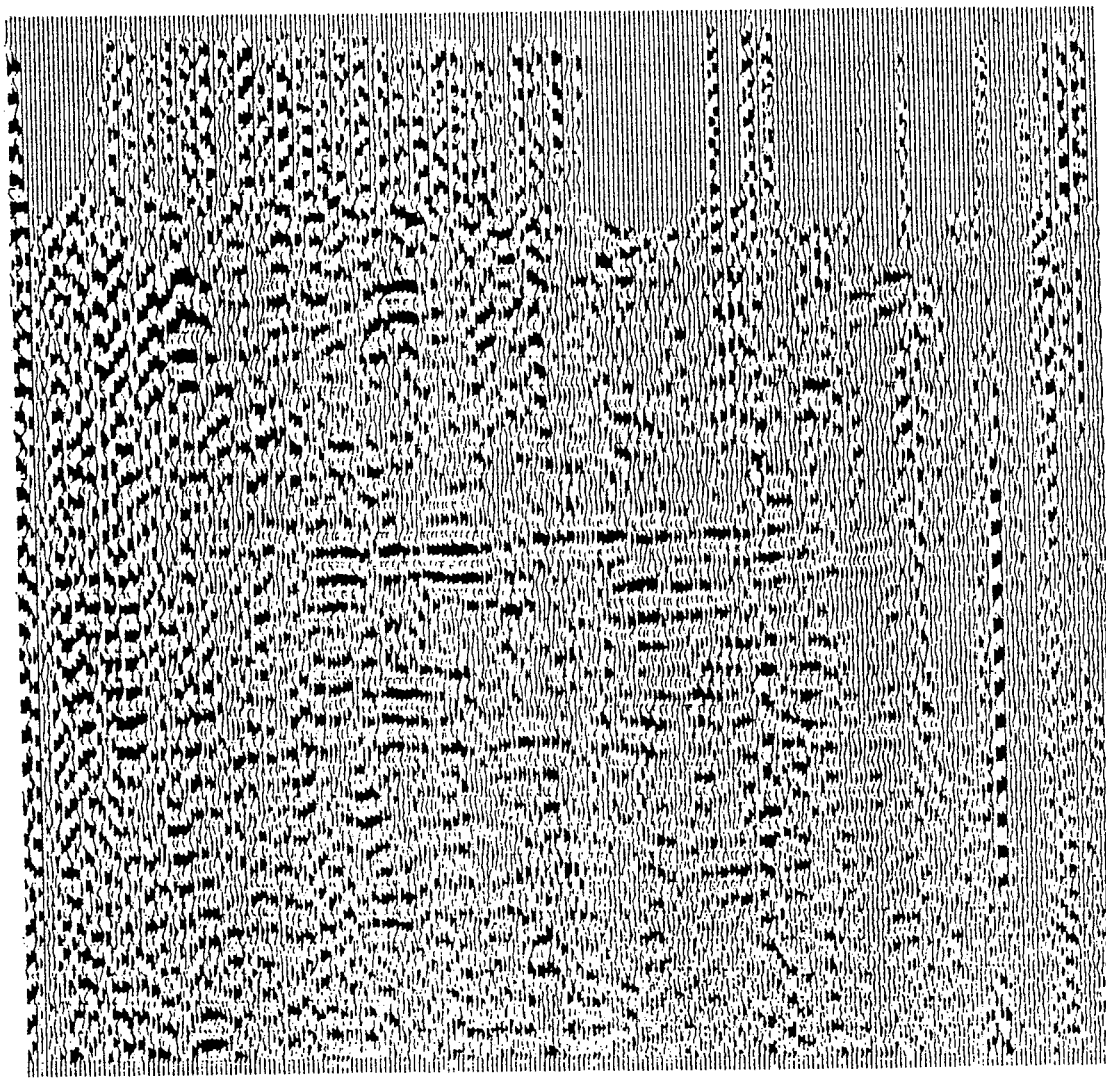
Figure 7C:
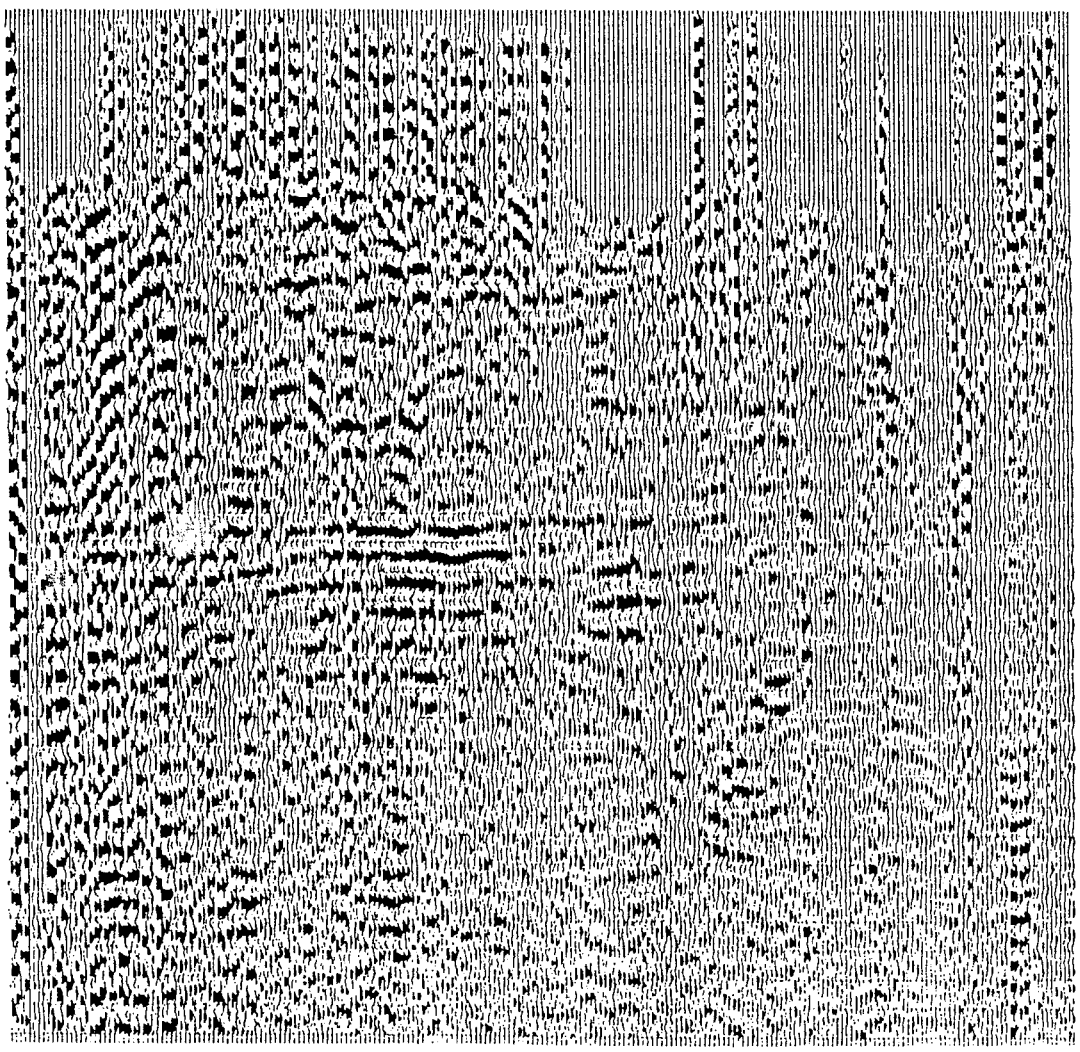
Figure 7D:
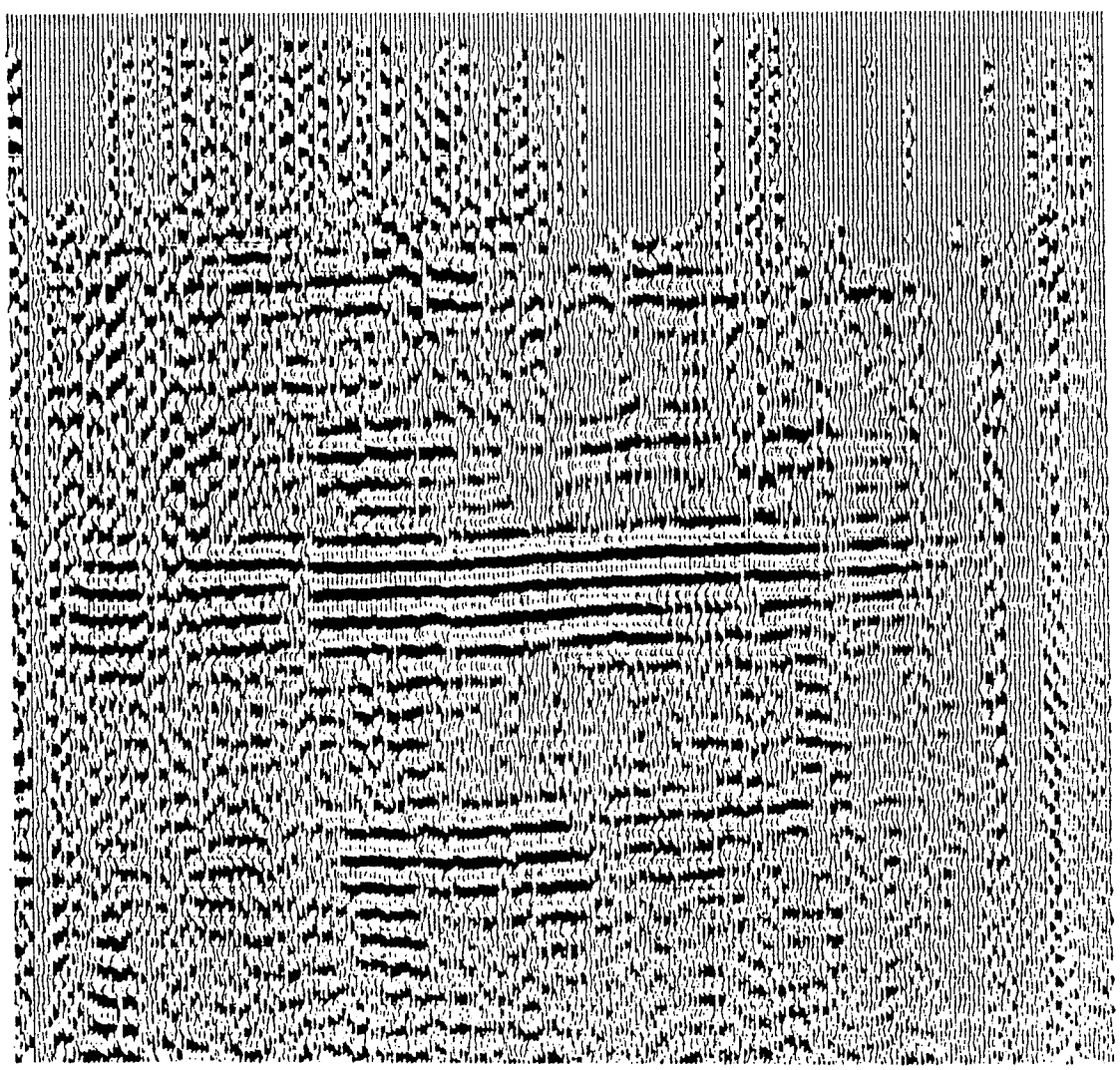
Figure 8A:
FIGS. 8a and b represent a diagonalized concord of seismic signals $\hat{\phi}_{cm}$ obtained by diagonalizing the concord of seismic signals $\phi_{ij}$ shown in FIGS. 6a, b, c and d.
Figure 8B:
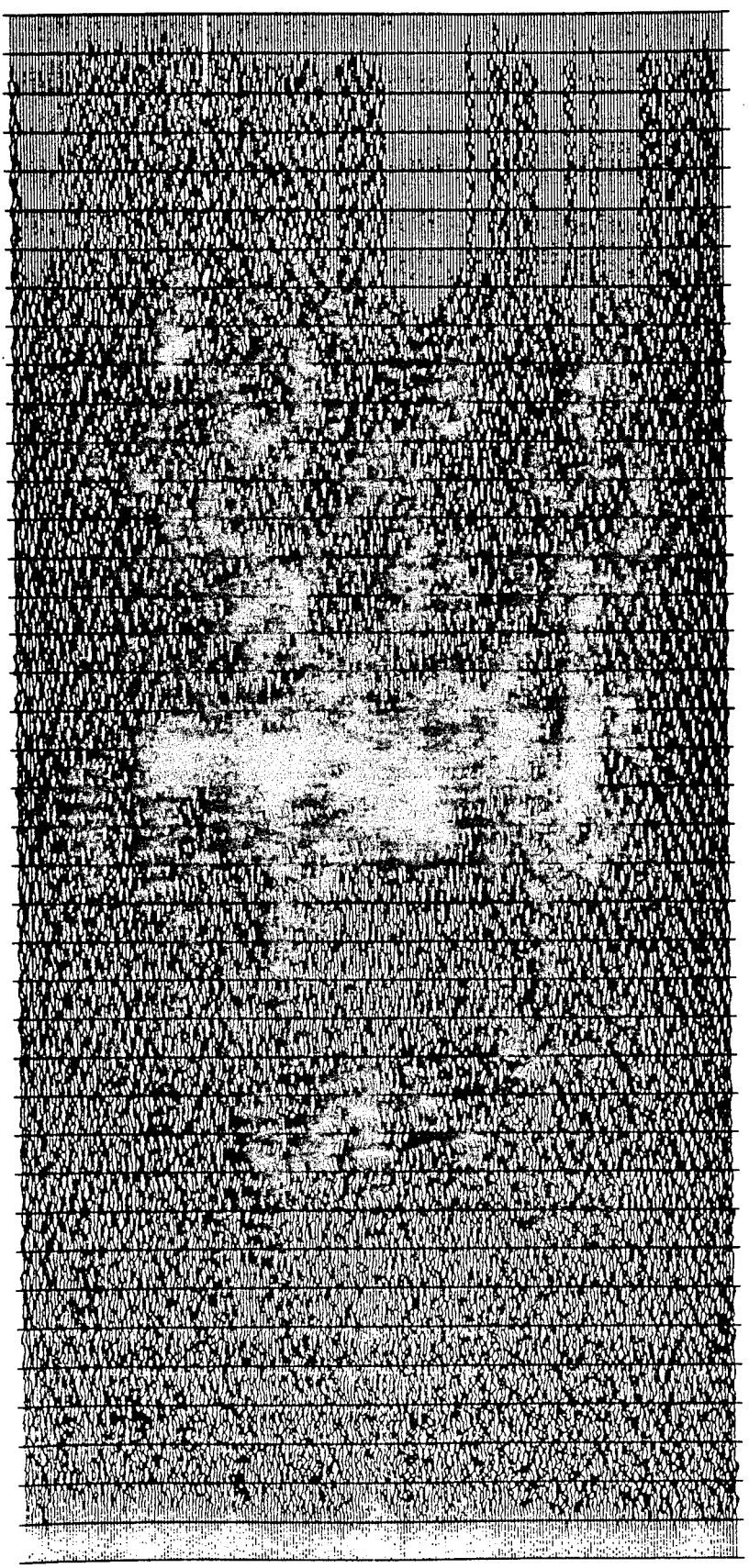

Exemplifying the preceding discussion, a concord of seismic signals $\phi_{ij}$ (as collected and with no rotation, i.e., $\theta = 0°$) are shown in FIGS. 6a, b, c and d; a concord of synthetic seismic signals $\bar{\phi}_{cm}$ (rotated through a constant preselected angle $\theta 32$ 60°) are shown in FIGS. 7a, b, c and d; and a concord of diagonalized seismic signals $\hat{\phi}_{cm}$ are shown in FIGS. 8a and b. The synthetic signals $\bar{\phi}_{cm}$ and the diagonalized seismic signal $\hat{\phi}_{cm}$ quite different from the original seismic signals $\phi_{ij}$ as well as from each other.

Additionally, I have found that the receiver and source rotation angles ($\theta_r$ and $\theta_s$, respectively) can vary over the time duration of the seismic signals $\phi_{ij}$. Moreover, the variation of the rotation angles ($\theta_r, \theta_s$) as a function of time can be displayed independently or overlayed on the concord of diagonalized seismic signals $\hat{\phi}_{cm}$ so as to provide additional insight to the exploration geophysicist in interpreting the earth's subterranean formations.

Figure 9A:
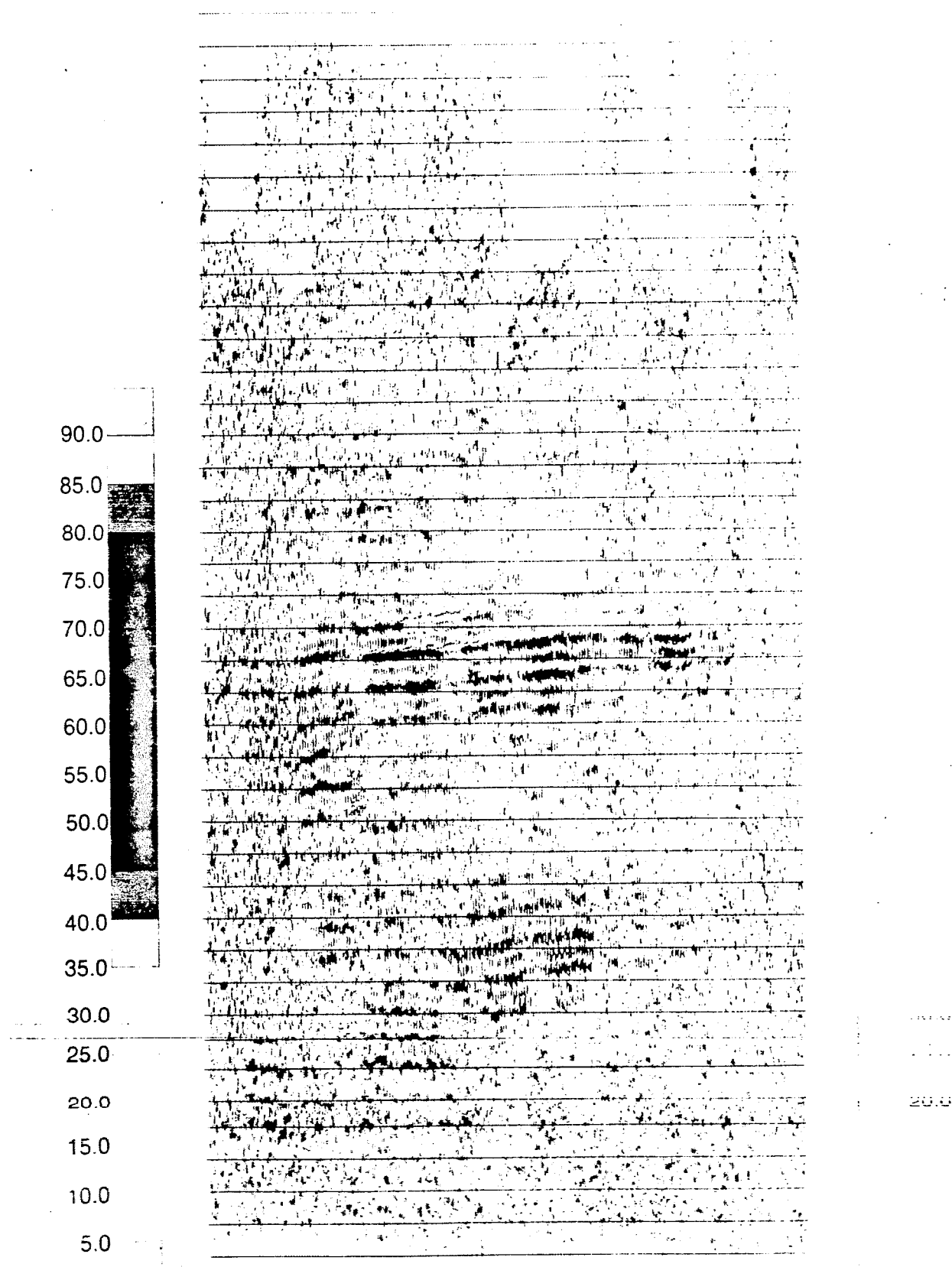
FIGS. 9a and b represent the diagonalized concord of seismic signals $\hat{\phi}_{cm}$ from FIGS. 8a and b with the average rotation angle overlayed thereon in color.
Figure 9:
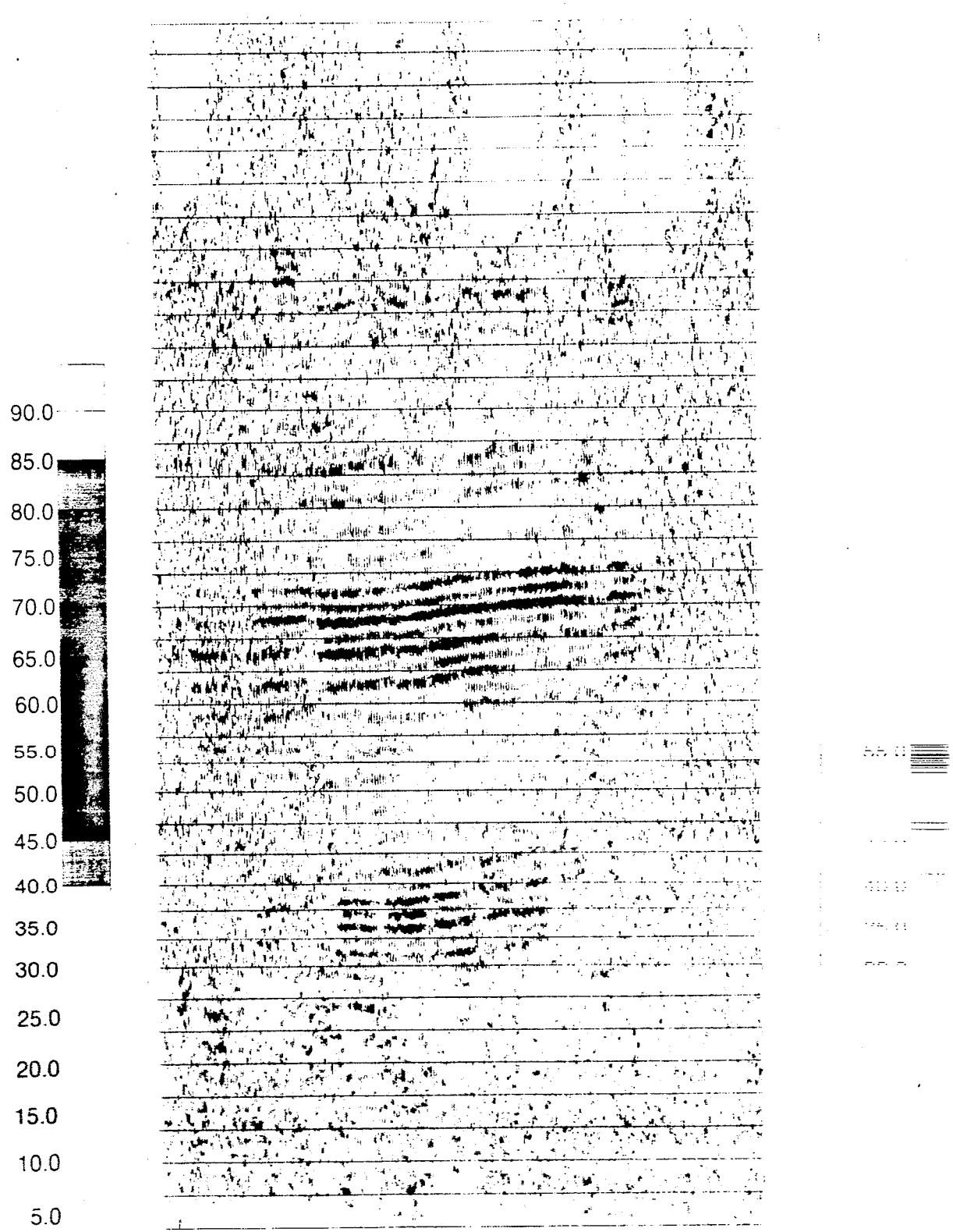

In FIGS. 9a and b, the average rotation angle $\theta(t)$ was overlayed on the diagonalized seismic signals $\hat{\phi}_{11}$ $\hat{\phi}_{22}$ and from FIGS. 8a and b. Here the average rotation angle $\theta(t)$ is represented as an overlayed color wherein different colors represent different angles according to the adjacent color scale.

The rotation module F in the preferred embodiment comprises a computer processing unit adapted to implement the source operator $M_{jm}$ and the receiver operator $C_{ci}$.

Poststack Application of the Rotation Module

Application of the rotation module F to stacked seismic data $\beta_{ij}$ has resulted in optimally rotated stacked seismic sections. The diagonalized seismic signals $\hat{\beta}_{cm}$ qualitatively agree with the stacked sections obtained by the visually selecting the best orientation from a plurality of constant angle synthetic seismic signals $\overline{\beta}_{cm}$. The optimally rotated stacked seismic sections show the dynamic mistie diagnostic of the azimuthally anisotropic medium, and the signal quality is improved.

The simultaneous interpretation of the rotation angle data ($\theta_r(t)$ and $\theta_s(t)$) and the amplitude data ($\phi_{ij}$) can be accomplished by displaying the diagonalized seismic signals $\hat{\phi}_{cm}$ and the rotation angles. The color assigned to each variable area sample bar is selected from a color table according to the rotation angle at that sample. This display technique accentuates the rotation angles calculated from high amplitude reflected events as previously shown in FIGS. 9a and b. An important aspect of the display technique is the ability to more easily relate the optimum rotation angles ($\theta_r$, $\theta_s$) or the average rotation angle ($\theta$) to the data across a seismic section.

Prestack Application of Rotation Module

Prestack application of the rotation module F is straight forward. However, due to the spherical wavefront from a localized source, and the requirement that transverse particle motion be tangent to the spherical wavefront, the polarization of the incident shear wave generated by such a polarized shear source is generally not parallel to the source polarization. This is a consequence of the geometry of the situation, not the result of azimuthal anisotropy.

Shear polarization splitting in an azimuthally anisotropic medium forces the particle motion to be resolved onto the principal axes of the medium. Consequently, the rotation angle required to minimize the splitting is not necessarily the angle that the source polarization makes with the anisotropy axes. In this case, the rotation angle which minimizes the splitting is space and time (or depth) variable, and its prediction requires the specification of a model.

In spite of this complication, the observed success of the fixed angle rotation as a function of time mode of the rotation module F support the observation that this esoteric effect is small for many cases of exploration interest. Physical field orientation tests further support the reduction of cross-talk by constant angle orientations.

Prestack application of the rotation module F attempts to compensate for the aforementioned geometrical polarization effects. Assuming that the correct orientation is unique, the fact that diagonalization results in the desired orthogonal components suggests that the process automatically calculates the geometrical correction. Visual comparisons indicate that the diagonalization produces results are comparable to the constant angle rotations.

Another important benefit of prestack diagonalization is the reduction of the data to only the optimal principal components. In addition to reducing the processing requirements, the separation of events allows each event to be optimally processed, thereby improving the quality of the final results.

PROCESSING CONCORDS OF SEISMIC SIGNALS

Figure 10:
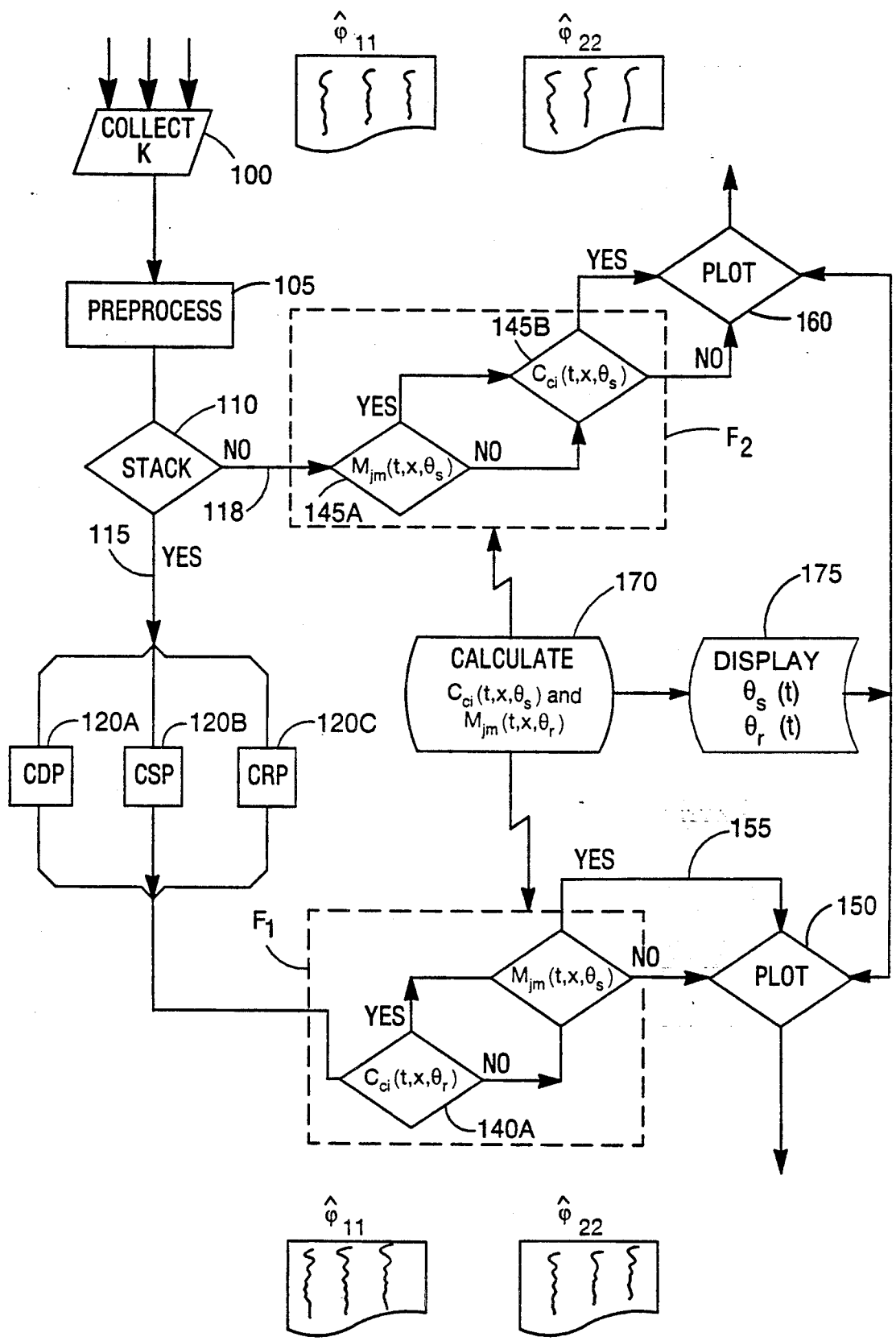
FIG. 10 is a generalized process flow diagram of the method of the present invention.

Looking now at FIG. 10, a generalized process flow diagram is shown for operating on a plurality of concords of seismic signals K. Block 100 represents a collection of all seismic signals $(\phi_{ij})_{pq}$ obtained in a seismic survey for selected combinations of source locations $S_q$ and receiver locations $R_p$. Proceeding to Block 105, the seismic signals $(\phi_{ij})_{pq}$ are processed including correlation, filtering, normal moveout correction, etc.

Block 110 is then entered and a decision is made whether to stack the seismic signals $(\phi_{ij})_{pq}$ before or after the operation of rotation module F. Proceeding first in direction 115 of a decision to stack before implementing the rotation module F, either block 120A or 120B or 120C is entered. Blocks 120A, 120B, and 120C each represent the different methods of stacking of the seismic signals $(\phi_{ij})_{pq}$ by way of example common depth point, common source point and common receiver point, respectively.

Next, the seismic signals $(\phi_{ij})_{pq}$ are operated on by the rotation module $F_1$. Here the distinction between rotation modules, i.e., $F_1$ and $F_2$, is merely for clarity since both contain the same operators. The rotation module $F_1$ includes a source operator $M_{jm}(t,\theta_s)$ designated in Block 140A and a seismic receiver operator $C_{ci}(t,\theta_r)$ designated in Block 140B. As previously noted, the seismic source operator $M_{jm}(t,\theta_s)$ is a specified rotation matrix adapted to transform the linearly independent lines of action of the elements $s_j$ in the set of seismic source S and to synthetic lines of action $\bar{s}_m$ different from that of the elements $s_j$. It is further noted that the seismic source operator $M_{jm}(t,\theta_r)$ is implicitly spatially dependent; i.e., the source operator $M_{jm}(t,\theta_s)$ can produce different rotations $\theta_s$ as a function of time and spatial location. Since the seismic signals $(\phi_{ij})_{pq}$ are implicitly dependent upon time and spatial location, operation of a time-dependent and spatially-dependent source operator $M_{jm}(t,\theta_s)$ can more accurately describe variations in the geological characteristics of subterranean formations which can vary as a function of both depth and spatial location.

Further, the receiver operator $C_{ci}(t,\theta)$ is implicitly spatially-dependent rotation matrix; i.e., the receiver operator $C_{ci}(t,\theta_r)$ can produce different rotation angles $\theta_r$ as a function of both time and spatial location. The receiver operator $C_{ci}(t,\theta_r)$ is thus a specified rotation matrix adapted to transform the linearly independent lines of action of the elements $r_i$ of the set of seismic receivers R into synthetic lines of action of the receiver elements $\bar{r}_c$ different from that of the elements $r_i$. Since the seismic signals $(\phi_{ij})_{pq}$ are implicitly dependent upon both time and spatial location, operation of a time and spatially-dependent receiver operator $C_{ci}(t,\theta_r)$ can more accurately describe the variations in the geologic characteristics as a function of depth of the subterranean formation and the spatial location.

Block 140A thus represents a decision whether or not to impress source operator $M_{jm}(t,\theta_s)$ on the stacked seismic signals $(\phi_{ij})_{pq}$. The extent of rotation of the source operator $M_{jm}(t,\theta_s)$ is determined in Block 170 and communicated to the rotation module $F_1$. The steps of calculating the rotation angle $\theta_s(t)$ for the source operator $M_{jm}(t,\theta_s)$ will be discussed later. Regardless of the decision made in Block 140A, Block 140B is entered and a decision is made whether or not to impress the receiver operator $C_{ci}(t,74_r)$ on the stacked seismic signals $(\phi_{ij})_{pq}$. The extent of rotation by the receiver operator $C_{ci}(t,\theta_r)$ is determined in Block 170 and communicated to the rotation module $F_1$. The steps of calculating the rotation angle $\theta_r(t)$ for the receiver operator $C_{ci}(t,\theta_r)$ will be discussed later.

Hence, the rotation module $F_1$ can produce one of three results: first, the operation of the source operator alone $M_{jm}(t,\theta_s)$; second, the operation of the receiver operator $C_{ci}(t,\theta_r)$ alone; and third, the combined operation of both source and receiver operators $C_{ci}(t,\theta_s)$ and $M_{jm}(t,\theta_r)$.

The synthesized stacked seismic signals $\overline{\phi_{cm}}_{pq}$ which have been produced by the rotation module $F_1$ are then directed to Block 150 whereby seismic sections can be produced for each of the components in the stack of seismic signals $(\phi_{ij})_{pq}$; i.e., $\phi_{11}$, $\phi_{12}$, $\phi_{21}$, and $\phi_{22}$. If the rotation module $F_1$ performs an identity rotation of the seismic signals $(\phi_{ij})_{pq}$, the concord of seismic sections $\phi_{ij}$, as shown FIG. 4, can be thought of as displaying the components of the seismic signals $\phi_{ij}$ as actually obtained. If, however, the rotation module $F_1$ performs a selected rotation of the stacked seismic signals $(\phi_{ij})_{pq}$, a synthetic concord of seismic data is produced which can be thought of as displaying the synthetic seismic signals $\hat{\phi}_{cm}$. Iterations in the extent of rotation by the rotation module $F_1$ can produce a plurality of synthetic seismic sections having incremental rotations.

Presently a seismologist can review a plurality of the synthetic concords of seismic data to ascertain which incremental rotation brings into focus the geological characteristics of interest in the subterranean formations in accordance with my copending Patent Application 663,160. The technique of focusing the seismic energy of the seismic wave so as to enhance the geological characteristics of the subterranean formation can be conceptualized as maximizing the output of the seismic energy imparted into the ground onto various of the synthetic concord of seismic sections.

Now looking at Block 170, calculation means are provided for determining the extent of rotation of both the source operator $M_{jm}(t,\theta_s)$ and the receiver operator $C_{ci}(t,\theta_r)$ necessary to diagonalize the concord of seismic signals $\phi_{ij}$. The calculation of either source operator $M_{jm}(t,\theta_s)$ or receiver operator $C_{ci}(t,\theta_r)$ includes three independent variables; i.e., time, spatial location and rotation angle. The process for calculating the extent of rotation angles $\theta_s$ and $\theta_r$ for the operators $C_{ci}(t,\theta_s)$ and $M_{jm}(t,\theta_r)$ are performed within a specified time window $\Delta t$ and for a specified spatial location employing Equations 5a, b, and c. That is, the operators $C_{ci}(t,\theta_s)$ and $M_{jm}(t,\theta_r)$ will operate only over a selected time window $\Delta t$ of the seismic signal $\phi_{ij}$ for a given spatial location $x_1$. The rotation angles $\theta_s(t)$ and $\theta_r(t)$ can then be individually plotted at 175 or overlayed on the resulting diagonalized seismic signals $\hat{\phi}_{cm}$ at 150.

If the operator $C_{ci}(t,\theta_s)$ and $M_{jm}(t,\theta_r)$ are assumed not to vary with time; i.e., both operators are constant with respect to time, the time window $\Delta t$ is equal to the record length of the seismic signal $\phi_{ij}$ and further iterations of time are not considered.

Returning now to block 110 of FIG. 10 and proceeding in direction 118 is a decision not to stack the concords of seismic signals $(\phi_{ij})_{pq}$ before impressing the operator $C_{ci}(t,x)$ and $M_{jm}(t,x)$ proceeds directly to the rotation module $F_2$. Thereafter the previously discussed operation of the rotation module $F$ including the operation of source operator $C_{ci}(t,\theta_s)$ at 145A, receiver operator $M_{jm}(t,\theta_r)$ at 145B in cooperation with the steps of determining the rotation angle $\theta_s$ and $\theta_r$ at 170 of the operators $C_{ci}(\Delta t,\theta_s)$ and $M_{jm}(\Delta t,\theta_r)$ is carried out. In Block 160 the diagonalized seismic signals $\hat{\phi}_{ij}$ which have been processed by the orientation module $F$ are displayed as synthetic concords of seismic data. It is to be noted that the resulting synthetic concord of seismic data can either be produced from selected gathers of the seismic signals $\phi_{ij}$ or alternatively any other mode of gathering the seismic signals $(\phi_{ij})_{pq}$ such as common depth point, common depth source point, common receiver point, etc.

As previously noted, the concord of seismic signals K also comprehends utilizing three seismic receivers and seismic sources each having independent, noncollinear lines of action. As presently envisioned, such a concord of seismic signals K could be obtained using mutually orthogonal sets of seismic sources and receivers such as are presently available; e.g., Sh, Sv and P wave sources and receivers. However, the present invention is not limited to the particular line of action of seismic sources and/or seismic receivers presently available. Having disclosed the fundamental concept of the present invention, it will be obvious to those skilled in the art that variations or modifications thereto can be obtained without departing from the scope of the invention.

I claim:

1. A method of seismic exploration employing seismic sources $s_j$ having at least two linearly independent lines of action j with respect to a survey line and seismic receivers $r_i$ having at least two linearly independent lines of action i with respect to the survey line, comprising the steps of:

(a) imparting seismic energy into the earth with seismic sources $s_j$;

(b) recording the earth's response to the imparted seismic energy with receivers $r_i$;

(c) collecting a concord of seismic signals $\phi_{ij}$, wherein the seismic energy imparted by seismic source $s_j$ are recorded by seismic receiver $r_i$; and (d) processing the full concord of seismic signals $\phi_{ij}$ consisting essentially of diagonalizing the amplitude values of the concord of seismic signals $\phi_{ij}$, as a concord, and obtaining a diagonalized concord of seismic signals $\hat{\phi}_{cm}$, wherein the amplitude values of the cross component seismic signals $\phi_{ij}$ of the concord of seismic signals are substantially reduced to zero.

2. The method of claim 1 wherein the seismic sources $s_j$ having at least two linearly independent lines of action j are selected from the group including compressional (P), vertical shear (Sv) and horizontal shear (Sh) seismic sources and the seismic receivers $r_i$ having at least two linearly independent lines of action i are selected from the group including compressional (P), vertical shear (Sv) and horizontal shear (Sh) seismic receivers.

3. The method of claim 1 wherein the step of collecting a concord of seismic signals $\phi_{ij}$ comprises collecting the seismic signals:

$$\begin{matrix} \phi_{11} & \phi_{12} \\ \phi_{21} & \phi_{22} \end{matrix} = \phi_{ij}.$$

4. The method of claim 1 wherein the step of collecting a concord of seismic signals $\phi_{ij}$ comprises collecting the seismic signals:

$$\begin{matrix} \phi_{11} & \phi_{12} & \phi_{13} \\ \phi_{21} & \phi_{22} & \phi_{23} \\ \phi_{31} & \phi_{32} & \phi_{33} \end{matrix} = \phi_{ij}.$$

5. The method of claim 1 wherein the step of producing a diagonalized concord of seismic signals $\hat{\phi}_{cm}$ comprises rotating the concord of seismic signals $\phi_{ij}$ according to:

$$C_{ci}(t,\theta_r) \, (\phi_{ij}) \, M_{jm}(t,\theta_s) = \hat{\phi}_{cm}$$

where
$C_{ci}$ is an operator for rotating the lines of action of the receivers $r_i$ through angles $\theta_r$ as a function of time so as to diagonalize the seismic signals $\phi_{ij}$ and
$M_{jm}$ is an operator for rotating the lines of action of the source $s_j$ through angles $\theta_s$ as a function of time so as to diagonalize the seismic signals $\phi_{ij}$.

6. A method of processing a concord of seismic signals $\phi_{ij}$ collected by imparting seismic energy into the earth with a seismic source $s_j$ having at least two linearly independent lines of action j and recording the earth's response with seismic receivers $r_i$ having at least two linearly independent lines of action i, comprising the steps of:
operating on a full concord of seismic signals $\phi_{ij}$, as a concord, and forming a diagonalized concord of seismic signals $\hat{\phi}_{cm}$ with a rotation module including a receiver operator $C_{ci}(\theta_r(t))$ for synthetically rotating the lines of action of the receiver $r_i$ through angles $\theta_r(t)$ and a source operator $M_{jm}(\theta_s(t))$ for synthetically rotating the lines of action of the source $s_j$ through angle $\theta_s(t)$ whereby the amplitude values of the cross-component terms of the diagonalized concord of seismic signals $\hat{\phi}_{cm}$ are substantially reduced to zero.

7. The method of claim 6 wherein the rotation module operates on the concord of seismic signals $\phi_{ij}$ to form a diagonalized concord of seismic signals according to:

$$C_{ci}(\theta_r(t)) \, (\phi_{ij}) \, M_{jm}(\theta_s(t)) = \hat{\phi}_{cm}$$

where $C_{ci}(\theta_r(t))$ is a receiver operator for rotating the lines of action of receivers $r_i$ through angles $\theta_r(t)$ and $M_{jm}(\theta_s(t))$ is a source operator for rotating the lines of action of sources through angle $\theta_s(t)$ $s_j$.

8. The method of claim 7 further including varying operators $C_{ci}(\theta_r(t))$ and $M_{jm}(\theta_s(t))$ as a function of spatial location.

9. The method of claim 7 wherein the concord of seismic signals $\phi_{ij}$ are common depth point gathers of seismic signals.

10. The method of claim 7 wherein the concord of seismic signals $\phi_{ij}$ are common depth point stacks of seismic signals.

11. The method of claim 6 further including the step of obtaining a measure of the rotation angles $\theta_s(t)$ and a measure of the rotation angle $\theta_r(t)$ to diagonalize the concord of seismic signal $\phi_{ij}$.

12. The method of claim 11 wherein the rotation angles $\theta_s(t)$ and $\theta_r(t)$ are obtained according to:

$$\phi_r(t) = \frac{\alpha - \gamma}{2}$$

$$\theta_s(t) = \frac{\alpha + \gamma}{2}$$

$$\gamma = \tan^{-1}\frac{(\phi_{12} - \phi_{21})}{(\phi_{11} + \phi_{22})}$$

$$\alpha = \tan^{-1}\frac{(\phi_{12} + \phi_{21})}{(\phi_{11} - \phi_{22})}$$

13. The method of claim 11 further including displaying a sum of the rotation angles $\theta_s(t)$ and $\theta_r(t)$ as a seismic trace.

14. The method of claim 11 further including the step of displaying a measure of the rotation angles $\theta_s(t)$ and $\theta_r(t)$ overlaid on the diagonalized concord of seismic signals $\hat{\phi}_{cm}$.

15. A method for processing a concord of seismic signals $\phi_{ij}$ collected by imparting seismic energy into the earth with a seismic source $s_j$ having at least two linearly independent lines of action j and recording the earth's response with seismic receivers having at least two linearly independent lines of action i, comprising the steps of:
determining rotation angle $\theta_r(t)$ and rotation angle $\theta_s(t)$ which diagonalize the full concord of seismic signals $\phi_{ij}$, whereby the amplitude values of the cross-component seismic signals of the diagonalized concord of seismic signals $\hat{\phi}_{cm}$ are substantially reduced to zero; and
displaying the rotation angles $\theta_r(t)$ and $\theta_s(t)$ as rotation angle traces.

16. The method of claim 14 further including the steps of:
determining a receiver rotation operator $C_{ci}(\theta_r(t))$ and a source rotation operator $M_{jm}(\theta_s(t))$ from the respective rotation angles $\theta_r(t)$ and $\theta_s(t)$; and
operating on the concord of seismic signals $\phi_{ij}$ with the receiver rotation operator $C_{ci}(\theta_r(t))$ and the source rotation operator $M_{jm}(\theta_s(t))$ so as to diagonalize the concord of seismic signals $\phi_{ij}$ whereby the amplitude values of the cross-component seismic signals of the diagonalized concord of seismic signals $\hat{\phi}_{cm}$ are substantially reduced to zero.

17. A method of seismic exploration employing seismic sources $s_j$ having at least two linearly independent lines of action j with respect to a survey line and seismic receivers $r_i$ having at least two linearly independent lines of action i with respect to the survey line, comprising the steps of:
(a) imparting seismic energy into the earth along two linearly independent lines of action;
(b) recording two linearly independent lines of action i of the earth's response to the seismic energy imparted along each line of action j;
(c) collecting a concord of seismic signals $\phi_{ij}$, wherein the seismic energy imparted along line of action j are recorded along lines of action i; and
(d) processing the full concord of seismic signals $\phi_{ij}$ consisting essentially of diagonalizing the amplitude values of the concord of seismic signals $\phi_{ij}$, as a concord, and obtaining a diagonalized concord of seismic signals $\hat{\phi}_{cm}$, wherein the amplitude values of the cross component seismic signals $\phi_{ij}$ of the concord of seismic signals are substantially reduced to zero.

18. The method of claim 17 wherein the seismic energy is imparted with seismic sources $s_j$ having linearly independent lines of action j and selected from the group including compressional (P), vertical shear (Sv) and horizontal shear (Sh) seismic sources and the seismic energy is recorded with seismic receivers $r_i$ having at least two linearly independent lines of action i are selected from the group including compressional (P), vertical shear (Sv) and horizontal shear (Sh) seismic receivers.

19. The method of claim 17 wherein the step of collecting a concord of seismic signals $\phi_{ij}$ comprises collecting the seismic signals:

$$\begin{matrix} \phi_{11} & \phi_{12} \\ \phi_{21} & \phi_{22} \end{matrix} = \phi_{ij}.$$

20. The method of claim 17 wherein the step of collecting a concord of seismic signals $\phi_{ij}$ comprises collecting the seismic signals:

$$\begin{matrix} \phi_{11} & \phi_{12} & \phi_{13} \\ \phi_{21} & \phi_{22} & \phi_{23} \\ \phi_{31} & \phi_{32} & \phi_{33} \end{matrix} = \phi_{ij}.$$

21. The method of claim 17 wherein the step of producing a diagonalized concord of seismic signals $\hat{\phi}_{cm}$ comprises rotating the concord of seismic signals $\phi_{ij}$ according to:

$$C_{ci}(t,\theta_r)\,(\phi_{ij})\,M_{jm}(T,\theta_s) = \hat{\phi}_{cm}$$

where
- $C_{ci}$ is an operator for rotating the lines of action i of the recorded seismic energy through angles $\theta_r$ as a function of time so as to diagonalize the seismic signals $\phi_{ij}$, and
- $M_{jm}$ is an operator for rotating the lines of action j of the imparted seismic energy through angles $\theta_s$ as a function of time so as to diagonalize the seismic signals $\phi_{ij}$.

22. A method of processing a concord of seismic signals $\phi_{ij}$ collected by imparting seismic energy into the earth along at least two linearly independent lines of action j and recording the earth's response thereto along two linearly independent lines of action i, comprising the steps of:
operating on a full concord of seismic signals $\phi_{ij}$, as a concord, and forming a diagonalized concord of seismic signals $\hat{\phi}_{cm}$ with a rotation module including a first operator $C_{ci}(\theta_r(t))$ for synthetically rotating the lines of action i of the recorded seismic energy through angles $\theta_r(t)$ and a second operator $M_{jm}(\theta_s(t))$ for synthetically rotating the lines of action j of the imparted seismic energy through angle $\theta_s(t)$ whereby the amplitude values of the cross-component seismic signals of the diagonalized concord of seismic signals $\hat{\phi}_{cm}$ are substantially reduced to zero.

23. The method of claim 22 wherein the rotation module operates on the concord of seismic signals $\phi_{ij}$ to form a diagonalized concord of seismic signals according to:

$$C_{ci}(\theta_r(t))\,(\phi_{ij})\,M_{jm}(\theta_s(t)) = \hat{\phi}_{cm}$$

where $C_{ci}(\theta_r(t))$ is the first operator for rotating the lines of action i through angles $\theta_r(t)$ and $M_{jm}(\theta_s(t))$ is the second operator for rotating the lines of action j through angle $\theta_s(t)$ $s_j$.

24. The method of claim 22 further including varying operators $C_{ci}(\theta_r(t))$ and $M_{jm}(\theta_s(t))$ as a function of spatial location.

25. The method of claim 22 wherein the concord of seismic signals $\phi_{ij}$ are common depth point gathers of seismic signals.

26. The method of claim 22 wherein the concord of seismic signals $\phi_{ij}$ are common depth point stacks of seismic signals.

27. The method of claim 23 further including the step of
obtaining a measure of the rotation angles $\theta_s(t)$ and a measure of the rotation angle $\theta_r(t)$ to diagonalize the concord of seismic signal $\phi_{ij}$.

28. The method of claim 27 wherein the rotation angles $\theta_s(t)$ and $\theta_r(t)$ are obtained according to:

$$\phi_r(t) = \frac{\alpha - \gamma}{2}$$

$$\theta_s(t) = \frac{\alpha + \gamma}{2}$$

$$\gamma = \tan^{-1} \frac{(\phi_{12} - \phi_{21})}{(\phi_{11} + \phi_{22})}$$

$$\alpha = \tan^{-1} \frac{(\phi_{12} + \phi_{21})}{(\phi_{11} - \phi_{22})}.$$

29. The method of claim 27 further including displaying a sum of the rotation angles $\theta_s(t)$ and $\theta_r(t)$ as a seismic trace.

30. The method of claim 27 further including the step of displaying a measure of the rotation angles $\theta_s(t)$ and $\theta_r(t)$ overlaid on the diagonalized concord of seismic signals $\hat{\phi}_{cm}$.

31. A method for processing a concord of seismic signals $\phi_{ij}$ collected by imparting seismic energy into the earth along two linearly independent lines of action j and recording the earth's response thereto along two linearly independent lines of action i, comprising the steps of:
determining rotation angle $\theta_r(t)$ and rotation angle $\theta_s(t)$ for diagonalizing the full concord of seismic signals $\phi_{ij}$, whereby the amplitude values of the cross-component seismic signals of the diagonalized concord of seismic signals $\hat{\phi}_{cm}$ are substantially reduced to zero; and
displaying the rotation angles $\theta_r(t)$ and $\theta_s(t)$ as rotation angle traces.

32. The method of claim 31 further including the steps of:
determining a first rotation operator $C_{ci}(\theta_r(t))$ and a second rotation operator $M_{jm}(\theta_s(t))$ from the respective rotation angles $\theta_r(t)$ and $\theta_s(t)$; and
operating on the concord of seismic signals $\phi_{ij}$ with the receiver rotation operator $C_{ci}(\theta_r(t))$ and the source rotation operator $M_{jm}(\theta_s(t))$ for diagonalizing the full concord of seismic signals $\phi_{ij}$ whereby amplitude values of the cross-component seismic signals of the diagonalized concord of seismic signals $\hat{\phi}_{cm}$ are substantially reduced to zero.

33. A method of seismic exploration, comprising the steps of:
  (a) imparting seismic energy into the earth along two linearly independent lines of action j;
  (b) recording the earth's response to the imparted seismic energy along two linearly independent lines of action i;
  (c) collecting a concord of seismic signals $\phi_{ij}$, wherein the seismic energy imparted along line of action j are recorded along line of action i;
  (d) processing the full concord of seismic signals $\phi_{ij}$, as a concord, and obtaining a measure of a rotation angle to diagonalize the concord of seismic signals $\phi_{ij}$; and
  (e) diagonalizing the concord of seismic signals $\phi_{ij}$, with the measure of the rotation angle to produce a diagonalized concord of seismic signals $\hat{\phi}_{cm}$ such that the amplitude values of the cross-component seismic signals of the diagonalized concord of seismic signals $\hat{\phi}_{cm}$ are substantially reduced to zero.

34. The method of claim 33 wherein the seismic energy is imparted by seismic sources $s_j$ having at least two linearly independent lines of action j are selected from the group including compressional (P), vertical shear (Sv) and horizontal shear (Sh) seismic sources and the seismic energy is recorded by seismic receivers $r_i$ having at least two linearly independent lines of action i are selected from the group including compressional (P), vertical shear (Sv) and horizontal shear (Sh) seismic receivers.

35. The method of claim 33 wherein the step of collecting a concord of seismic signals $\phi_{ij}$ comprises collecting the seismic signals:

$$\begin{matrix} \phi_{11} & \phi_{12} \\ \phi_{21} & \phi_{22} \end{matrix} = \phi_{ij}.$$

36. The method of claim 33 wherein the step of collecting a concord of seismic signal $\phi_{ij}$ comprises collecting the seismic signals:

$$\begin{matrix} \phi_{11} & \phi_{12} & \phi_{13} \\ \phi_{21} & \phi_{22} & \phi_{23} \\ \phi_{31} & \phi_{32} & \phi_{33} \end{matrix} = \phi_{ij}.$$

37. The method of claim 33 wherein the step of producing a diagonalized concord of seismic signals $\hat{\phi}_{cm}$ comprises rotating the concord of seismic signals $\phi_{ij}$ with the rotation angles according to:

$$C_{ci}(t,\theta_r) (\phi_{ij}) M_{jm}(t,\theta_s) = \hat{\phi}_{cm}$$

where
  $C_{ci}$ is an operator for rotating the lines of action i of the recorded seismic energy through rotation angles $\theta_r$ as a function of time so as to diagonalize the seismic signals $\phi_{ij}$ and
  $M_{jm}$ is an operator for rotating the lines of action j of the imparted seismic energy through rotation angles $\theta_s$ as a function of time so as to diagonalize the seismic signals $\phi_{ij}$.

38. A method of processing a concord of seismic signals $\phi_{ij}$ collected by imparting seismic energy into the earth along two linearly independent lines of action j and recording the earth's response thereto along at least two linearly independent lines of action i, comprising the steps of:
  (a) obtaining a measure of the rotation angles $\theta_s(t)$ and a measure of the rotation angles $\theta_r(t)$ to diagonalize the concord of seismic signal $\phi_{ij}$; and
  (b) operating on the full concord of seismic signals $\phi_{ij}$ with rotation angles $\theta_r(t)$ and $\theta_s(t)$ and forming a diagonalized concord of seismic signals $\hat{\phi}_{cm}$ with a rotation module whereby the amplitude values of the cross-component seismic signals of the diagonalized concord of seismic signals $\hat{\phi}_{cm}$ are substantially reduced to zero.

39. The method of claim 38 wherein the rotation module operates on the concord of seismic signals $\phi_{ij}$ to form a diagonalized concord of seismic signals according to:

$$C_{ci}(\theta_r(t)) (\phi_{ij}) M_{jm}(\theta_s(t)) = \hat{\phi}_{cm}$$

where $C_{ci}(\theta_r(t))$ is the first operator for rotating the lines of action i of the recorded seismic energy $r_i$ through angles $\theta_r(t)$ and $M_{jm}(\theta_s(t))$ is a source operator for rotating the lines of action j of the imparted seismic energy through angle $\theta_s(t) s_j$.

40. The method of claim 39 further including varying operators $C_{ci}(\theta_r(t))$ and $M_{jm}(\theta_s(t))$ as a function of spatial location.

41. The method of claim 39 wherein the concord of seismic signals $\phi_{ij}$ are common depth point gathers of seismic signals.

42. The method of claim 39 wherein the concord of seismic signals $\phi_{iij}$ are common depth point stacks of seismic signals.

43. The method of claim 38 wherein the rotation angles $\theta_s(t)$ and $\theta_r(t)$ are obtained according to:

$$\theta_r(t) = \frac{\alpha - \lambda}{2}$$

$$\theta_s(t) = \frac{\alpha + \lambda}{2}$$

where $$\lambda = \tan^{-1} \frac{(\phi_{12} - \phi_{21})}{(\phi_{11} + \phi_{22})}$$

$$\alpha = \tan^{-1} \frac{(\phi_{12} - \phi_{21})}{(\phi_{11} + \phi_{22})}.$$

44. The method of claim 38 further including displaying a sum of the rotation angles $\theta_s(t)$ and $\theta_r(t)$ as a seismic trace.

45. The method of claim 38 further including the step of displaying a measure of the rotation angles $\theta_s(t)$ and $\theta_r(t)$ overlaid on the diagonalized concord of seismic signals $\hat{\phi}_{cm}$.

* * * * *